United States Patent
Donaldson

(10) Patent No.: US 8,662,625 B2
(45) Date of Patent: Mar. 4, 2014

(54) METHOD OF PRINTHEAD CALIBRATION BETWEEN MULTIPLE PRINTHEADS

(75) Inventor: Patricia J. Donaldson, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 198 days.

(21) Appl. No.: 13/369,154

(22) Filed: Feb. 8, 2012

(65) Prior Publication Data
US 2013/0201245 A1 Aug. 8, 2013

(51) Int. Cl.
*B41J 29/393* (2006.01)

(52) U.S. Cl.
USPC ................................................. 347/19

(58) Field of Classification Search
CPC ............................. B41J 29/393; B41J 2/17593
USPC ............................................. 347/9, 14, 15, 19
See application file for complete search history.

(56) References Cited

U.S. PATENT DOCUMENTS

| | | | |
|---|---|---|---|
| 5,343,231 A | 8/1994 | Suzuki | |
| 5,451,990 A | 9/1995 | Sorenson et al. | |
| 5,600,350 A | 2/1997 | Cobbs et al. | |
| 5,796,414 A | 8/1998 | Sievert et al. | |
| 6,076,915 A | 6/2000 | Gast et al. | |
| 6,089,693 A | 7/2000 | Drake et al. | |
| 6,196,652 B1 | 3/2001 | Subirada et al. | |
| 6,275,600 B1 | 8/2001 | Banker et al. | |
| 6,300,968 B1 | 10/2001 | Kerxhalli et al. | |
| 6,334,720 B1 | 1/2002 | Kato et al. | |
| 6,377,758 B1 | 4/2002 | OuYang et al. | |
| 6,467,867 B1 | 10/2002 | Worthington et al. | |
| 6,494,558 B1 | 12/2002 | Doval et al. | |
| 6,554,390 B2 | 4/2003 | Arquilevich et al. | |
| 6,637,853 B1 | 10/2003 | Ahne et al. | |
| 6,847,465 B1 | 1/2005 | Wetchler et al. | |
| 6,883,892 B2 | 4/2005 | Sievert et al. | |
| 6,942,313 B2 | 9/2005 | Kanda | |
| 6,993,275 B2 | 1/2006 | Mitsuya et al. | |
| 7,073,883 B2 | 7/2006 | Billow | |
| 7,118,188 B2 | 10/2006 | Vilanova et al. | |
| 7,254,254 B2 | 8/2007 | Ueda et al. | |
| 7,309,118 B2 | 12/2007 | Mizes et al. | |
| 7,380,897 B2 | 6/2008 | Anderson et al. | |
| 7,390,073 B2 | 6/2008 | Bailey et al. | |
| 7,391,525 B2 | 6/2008 | Chapman et al. | |
| 7,478,894 B2 | 1/2009 | Kim et al. | |
| 7,515,305 B2 | 4/2009 | Mizes | |
| 7,549,721 B2 | 6/2009 | Nakano et al. | |
| 7,552,986 B2 | 6/2009 | Mizes et al. | |
| 7,607,752 B2 | 10/2009 | Childers et al. | |
| 7,630,653 B2 | 12/2009 | Bonino | |
| 7,637,586 B2 | 12/2009 | Yun | |
| 7,686,298 B2 | 3/2010 | Fioravanti et al. | |
| 8,292,398 B2 * | 10/2012 | Mizes et al. | 347/19 |
| 2002/0135629 A1 | 9/2002 | Sarmast et al. | |
| 2003/0231350 A1 | 12/2003 | Yamagishi | |
| 2004/0160468 A1 | 8/2004 | Kim et al. | |
| 2005/0099447 A1 | 5/2005 | Hsu et al. | |

(Continued)

*Primary Examiner* — An Do
(74) *Attorney, Agent, or Firm* — Maginot, Moore & Beck, LLP

(57) ABSTRACT

A method of identifying positions of a plurality of printheads in a printer is described. The printer identifies the positions of each of the plurality of printheads with reference to image data of a printed test pattern. The printer calibrates one or more printheads using only a single test pattern to correct registration errors in the printheads.

26 Claims, 14 Drawing Sheets

(56) References Cited

U.S. PATENT DOCUMENTS

2009/0322849 A1 12/2009 Calamita et al.
2010/0013882 A1 1/2010 Mizes et al.
2011/0242187 A1 10/2011 Mongeon et al.

\* cited by examiner

METHOD OF PRINTHEAD CALIBRATION BETWEEN MULTIPLE PRINTHEADS

CROSS-REFERENCE TO RELATED APPLICATION

This application cross-references commonly-owned co-pending application Ser. No. 12/754,735 filed on Apr. 6, 2010, entitled "Test Pattern Effective For Fine Registration Of Inkjet Printheads And Method Of Analysis Of Image Data Corresponding To The Test Pattern In An Inkjet Printer," the disclosure of which is expressly incorporated herein by reference.

TECHNICAL FIELD

This disclosure relates generally to in situ identification of printhead registration in an inkjet printer having one or more printheads, and, more particularly, to in situ analysis of image data to identify printhead registration.

BACKGROUND

Inkjet printers operate a plurality of inkjets in each printhead to eject liquid ink onto an image receiving member. The ink can be stored in reservoirs that are located within cartridges installed in the printer. Such ink can be aqueous ink or an ink emulsion. Other inkjet printers receive ink in a solid form and then melt the solid ink to generate liquid ink for ejection onto the imaging member. In these solid ink printers, the solid ink can be in the form of pellets, ink sticks, granules, pastilles, or other shapes. The solid ink pellets or ink sticks are typically placed in an ink loader and delivered through a feed chute or channel to a melting device, which melts the solid ink. The melted ink is then collected in a reservoir and supplied to one or more printheads through a conduit or the like. Other inkjet printers use gel ink. Gel ink is provided in gelatinous form, which is heated to a predetermined temperature to alter the viscosity of the ink so the ink is suitable for ejection by a printhead. Once the melted solid ink or the gel ink is ejected onto the image receiving member, the ink returns to a solid, but malleable form, in the case of melted solid ink, and to gelatinous state, in the case of gel ink.

A typical inkjet printer uses one or more printheads with each printhead containing an array of individual nozzles through which drops of ink are ejected by inkjets across an open gap to an image receiving member to form an ink image. The image receiving member can be a continuous web of recording media, a series of media sheets, or the image receiving member can be a rotating surface, such as a print drum or endless belt. Images printed on a rotating surface are later transferred to recording media by mechanical force in a transfix nip formed by the rotating surface and a transfix roller. In an inkjet printhead, individual piezoelectric, thermal, or acoustic actuators generate mechanical forces that expel ink through an aperture, usually called a nozzle, in a faceplate of the printhead. The actuators expel an ink drop in response to an electrical signal, sometimes called a firing signal. The magnitude, or voltage level, of the firing signals affects the amount of ink ejected in an ink drop. The firing signal is generated by a printhead controller with reference to image data. A print engine in an inkjet printer processes the image data to identify the inkjets in the printheads of the printer that must be operated to eject a pattern of ink drops at particular locations on the image receiving member to form an ink image corresponding to the image data. The locations where the ink drops landed are sometimes called "ink drop locations," "ink drop positions," or "pixels." Thus, a printing operation can be viewed as the placement of ink drops on an image receiving member with reference to electronic image data.

In order for the printed images to correspond closely to the image data, both in terms of fidelity to the image objects and the colors represented by the image data, the printheads are registered with reference to the imaging surface and with the other printheads in the printer. Registration of printheads refers to a process in which the printheads are operated to eject ink in a known pattern and then the printed image of the ejected ink is analyzed to determine the relative positions of the printheads with reference to the imaging surface and with reference to the other printheads in the printer. Operating the printheads in a printer to eject ink in correspondence with image data presumes that the printheads are level with one another across a width of the image receiving member and that all of the inkjets in the printhead are operational. The presumptions regarding the positions of the printheads, however, cannot be assumed, but must be verified. Additionally, if the conditions for proper operation of the printheads cannot be verified, the analysis of the printed image should generate data that can be used either to adjust the printheads so they better conform to the presumed conditions for printing or to compensate for the deviations of the printheads from the presumed conditions.

Analysis of printed images is performed with reference to two directions. "Process direction" refers to the direction in which the image receiving member is moving as the imaging surface passes the printhead to receive the ejected ink and "cross-process direction" refers to the direction across the width of the image receiving member, which is perpendicular to the process direction. In order to analyze a printed image, a test pattern needs to be generated in a manner that enables determinations to be made as to whether the inkjets operated to eject ink did, in fact, eject ink and whether the ejected ink landed where the ink would have landed if the printhead was positioned correctly with reference to the image receiving member and the other printheads in the printer. In some printing systems, an image of a printed image is generated by printing the ink image onto media or by printing the ink image on an intermediate surface and then transferring the ink image onto media. In both systems, the media is ejected from the system and then scanned with a flatbed scanner or other known offline imaging device. This method of generating a picture of the printed image suffers from the inability to analyze the printed image in situ and from the inaccuracies imposed by the external scanner. In some printers, a scanner is integrated into the printer and positioned at a location in the printer that enables image data corresponding to the ink image while the image is on media within the printer or while the ink image is on the rotating image receiving member.

These integrated scanners typically include one or more illumination sources and a plurality of optical detectors that receive radiation from the illumination source that has been reflected from the image receiving surface. The radiation from the illumination source is usually visible light, but the radiation can be at or beyond either end of the visible light spectrum. If light is reflected by a white surface, the reflected light has the same spectrum as the illuminating light. In some systems, ink on the imaging surface can absorb a portion of the incident light, which causes the reflected light to have a different spectrum. In addition, some inks may emit radiation in a different wavelength than the illuminating radiation, such as when an ink fluoresces in response to a stimulating radiation. Each optical sensor generates an electrical signal that corresponds to the reflected light received by the detector. The electrical signals from the optical detectors can be converted to digital signals by analog/digital converters and provided as digital image data to an image processor.

The environment in which the image data are generated is not pristine. Several sources of noise exist in this scenario and should be addressed in the registration process. For one, alignment of the printheads can deviate from an expected position significantly, especially when different types of imaging surfaces are used or when printheads are replaced. Additionally, not all inkjets in a printhead remain operational without maintenance. Thus, a need exists to continue to register the printheads before maintenance can recover the missing jets. Also, some inkjets are intermittent, meaning the inkjet may fire sometimes and not at others. Inkjets also may not eject ink perpendicularly with respect to the face of the printhead. These off-angle ink drops land at locations other than where they are expected to land. The image receiving member also contributes noise. Specifically, image data corresponding to structure in the image receiving surface and/or colored contaminants in the image receiving surface can be mistakenly identified as ink drops and lightly colored inks and weakly performing inkjets provide ink drops that contrast less starkly with the image receiving member than darkly colored inks or ink drops formed with an appropriate ink drop mass.

In existing systems, the registration process includes two phases referred to as coarse registration and fine registration. The coarse registration process moves multiple printheads in the printer into alignment with a relatively large tolerance. The fine registration process begins after completion of the coarse registration process and performs further adjustments to the registration of the printheads to complete the calibration of the printheads. In existing embodiments, the printed patterns generated in the coarse registration process lack the resolution needed to register the printheads in the printer with sufficient precision to produce the highest quality printed images. Additionally, a fine registration process is incapable of identifying and correcting printhead registration errors that exceed a maximum registration error size covered by the fine registration process. A printer that performs both the coarse and fine registration processes consumes time as well as other resources, such as ink and paper, when performing both the coarse and fine registration processes. Consequently, improvements to the printhead registration process that reduce the time and resources consumed to calibrate the printheads would be beneficial.

SUMMARY

In one embodiment, a method for analyzing image data in a test pattern printed in a printer to identify the position of a printhead in the printer has been developed. The method includes identifying, with reference to a first threshold and a second threshold, a process direction position for each row of dashes in a plurality of rows of dashes in image data of a test pattern printed on an image receiving member, the test pattern being formed by each printhead in a plurality of printheads in a printer forming at least one dash in each row of dashes in the plurality of rows of dashes, identifying a center of each dash in a cross-process direction, identifying an inkjet that formed each dash in the plurality of rows of dashes, and identifying a cross-process direction position for one printhead in the plurality of printheads in the printer with reference to the identified cross-process direction centers of dashes formed by the identified inkjets in the one printhead.

In another embodiment, an inkjet printer has been developed. The inkjet printer includes a plurality of printheads arranged in a plurality of rows in a cross-process direction and columns in a process direction of a print zone, each printhead having a plurality of inkjets configured to eject ink drops onto an image receiving member moving past the plurality of printheads in the process direction, a plurality of optical detectors configured in the cross-process direction across the image receiving member, and a controller operatively connected to the plurality of printheads and the plurality of optical detectors. Each optical detector in the plurality of optical detectors is configured to detect light reflected from the image receiving member. The controller is configured to generate a plurality of firing signals to eject ink from the plurality of inkjets in each printhead of the plurality of printheads to print a test pattern on the image receiving member, the test pattern including a plurality of rows of dashes, each row including a plurality of dashes printed by each printhead of the plurality of printheads, generate image data corresponding to the plurality of rows of dashes on the image receiving member with the plurality of optical detectors, identify, with reference to a first threshold and a second threshold, a process direction position for each row of dashes in the plurality of rows of dashes in the image data, identify a center of each dash in a cross-process direction, identify an inkjet that formed each dash in the row of dashes, and identify a cross-process direction position for one printhead in the plurality of printheads with reference to the identified cross-process direction centers of dashes formed by the identified inkjets in the one printhead.

BRIEF DESCRIPTION OF THE DRAWINGS

The foregoing aspects and other features of a printer that generates a test pattern that better identifies printhead positions within the print zone and that analyzes the image data corresponding to the generated test pattern are explained in the following description, taken in connection with the accompanying drawings.

DETAILED DESCRIPTION

Figure 1:
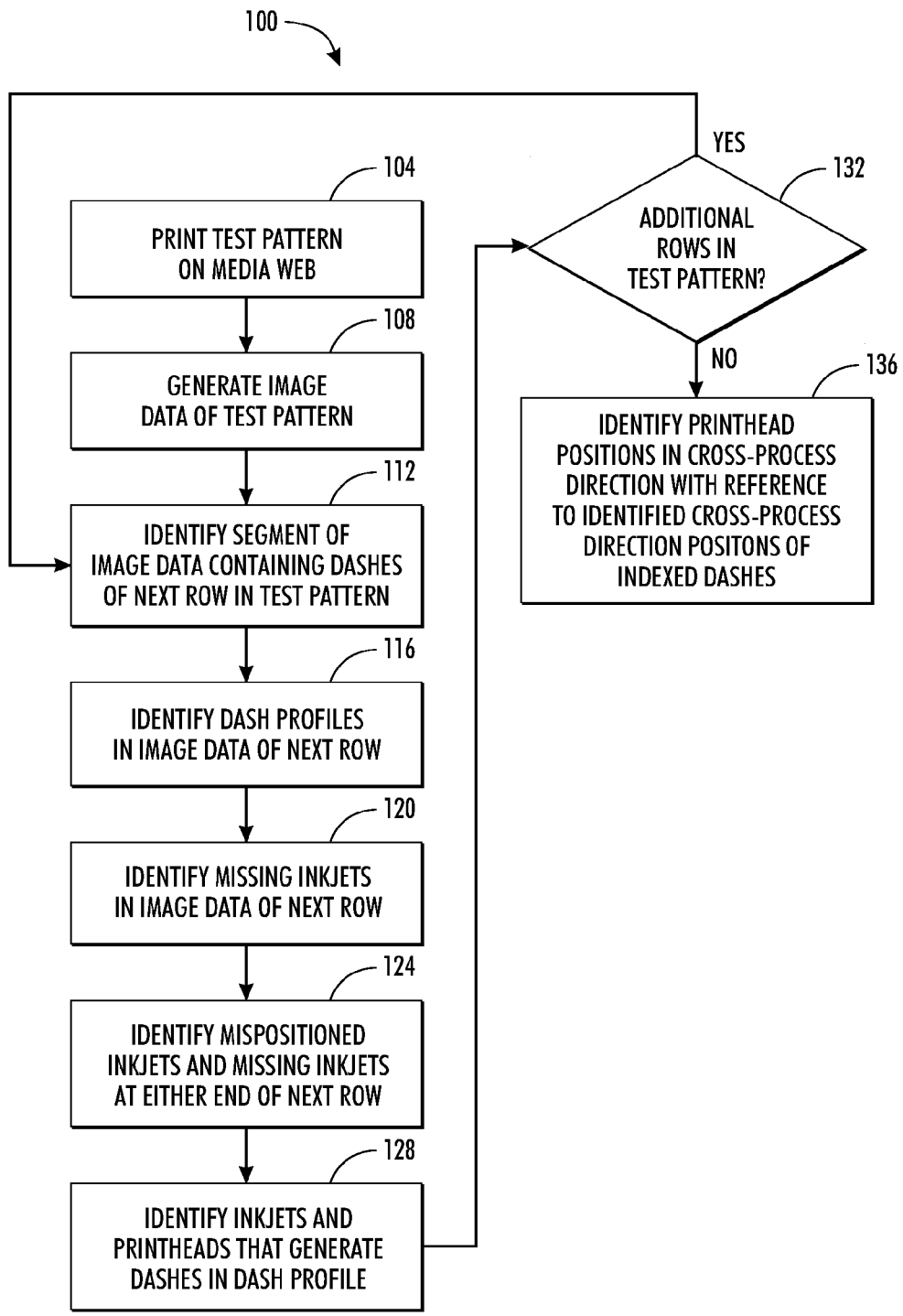
FIG. 1 is a block diagram of a process for identifying the positions of multiple printheads arranged in a print zone.

For a general understanding of the present embodiments, reference is made to the drawings. In the drawings, like reference numerals have been used throughout to designate like elements. As used herein, the terms "printer" generally refer to an apparatus that applies an ink image to print media and can encompass any apparatus, such as a digital copier, bookmaking machine, facsimile machine, multi-function machine, etc., which performs a print outputting function for any purpose. The printer prints ink images on an image receiving member, and the term "image receiving member" as used herein refers to print media or an intermediate member, such as a drum or belt, which carries an ink image and transfers the ink image to a print medium. "Print media" can be a physical sheet of paper, plastic, or other suitable physical substrate suitable for receiving ink images, whether precut or web fed. As used in this document, "ink" refers to a colorant that is liquid when applied to an image receiving member. For example, ink can be aqueous ink, ink emulsions, melted phase change ink, or gel ink that has been heated to a temperature that enables the ink to be liquid for application or ejection onto an image receiving member and then return to a gelatinous state. A printer can include a variety of other components, such as finishers, paper feeders, and the like, and can be embodied as a copier, printer, or a multifunction machine. An image generally includes information in electronic form, which is to be rendered on print media by a marking engine and can include text, graphics, pictures, and the like.

The term "printhead" as used herein refers to a component in the printer that is configured to eject ink drops onto the image receiving member. A typical printhead includes a plurality of inkjets that are configured to eject ink drops of one or more ink colors onto the image receiving member. The inkjets are arranged in an array of one or more rows and columns. In some embodiments, the inkjets are arranged in staggered diagonal rows across a face of the printhead. Various printer embodiments include one or more printheads that form ink images on the image receiving member. Some printer embodiments include a plurality of printheads arranged in a print zone. An image receiving member, such as a print medium or an intermediate member that holds a latent ink image, moves past the printheads in a process direction through the print zone. The inkjets in the printheads eject ink drops in rows in a cross-process direction, which is perpendicular to the process direction across the image receiving member.

As used herein, the term "dash" refers to a mark formed on an image receiving member that includes a series of ink drops extending in the process direction formed by a single inkjet in a printhead. A dash can be formed from ink drops located in adjacent pixels in the process direction on the image receiving member and can include a pattern of on/off adjacent pixels in the process direction. As used herein, the term "pixel" refers to a location on the image receiving member that receives an individual ink drop from an inkjet. Locations on the image receiving member can be identified with a grid-like pattern of pixels extending in the process direction and cross-process direction on the image receiving member. As used herein, the term "test pattern" refers to a predetermined arrangement of dashes formed on an image receiving member by one or more printheads in the printer. In some embodiments, a test pattern includes a predetermined arrangement of a plurality of dashes formed by some or all of the inkjets in the printheads arranged in the print zone.

As used herein, the term "reflectance value" refers to a numeric value assigned to an amount of light that is reflected from a pixel on the image receiving member. In some embodiments, the reflectance value is assigned to an integer value of between 0 and 255. A reflectance value of 0 represents a minimum level of reflected light, such as a pixel that is covered in black ink, and a reflectance value of 255 represents a maximum level of reflected light, such as light reflected from white paper used as an image receiving member. In other embodiments the reflectance value can be a non-integer value that covers a different numeric range. Some embodiments measure reflectance values that include multiple numeric values corresponding to different color separations such as red, green, and blue (RGB) values. In a test pattern that includes dashes printed on a highly reflective image receiving member, the image data corresponding to a dash have lower image reflectance values than the surrounding image receiving member.

FIG. 1 depicts a process 100 for identification of the cross-process positions of printheads in a printer. The process 100 is described in conjunction with a printer 5 depicted in FIG. 10. For the purposes of this disclosure, the printer is in the form of the direct inkjet printer 5 that employs one or more inkjet printheads and an associated solid ink supply. However, the systems and methods described herein are applicable to any of a variety of other printers that use inkjets in one or more printheads to eject one or more inks to a medium or media. The printer includes a print engine to process the image before generating the control signals for operation of the inkjets. The ink is any suitable substance that includes one or more dyes or pigments that is applied to the selected media. The ink can be black, or any other desired color, and a given printer can be capable of applying a plurality of differently colored inks to the media. The media can include any of a variety of substrates, including plain paper, coated paper, glossy paper, or transparencies, among others, and the media can be provided in sheets, rolls, or other physical formats.

Figure 10:
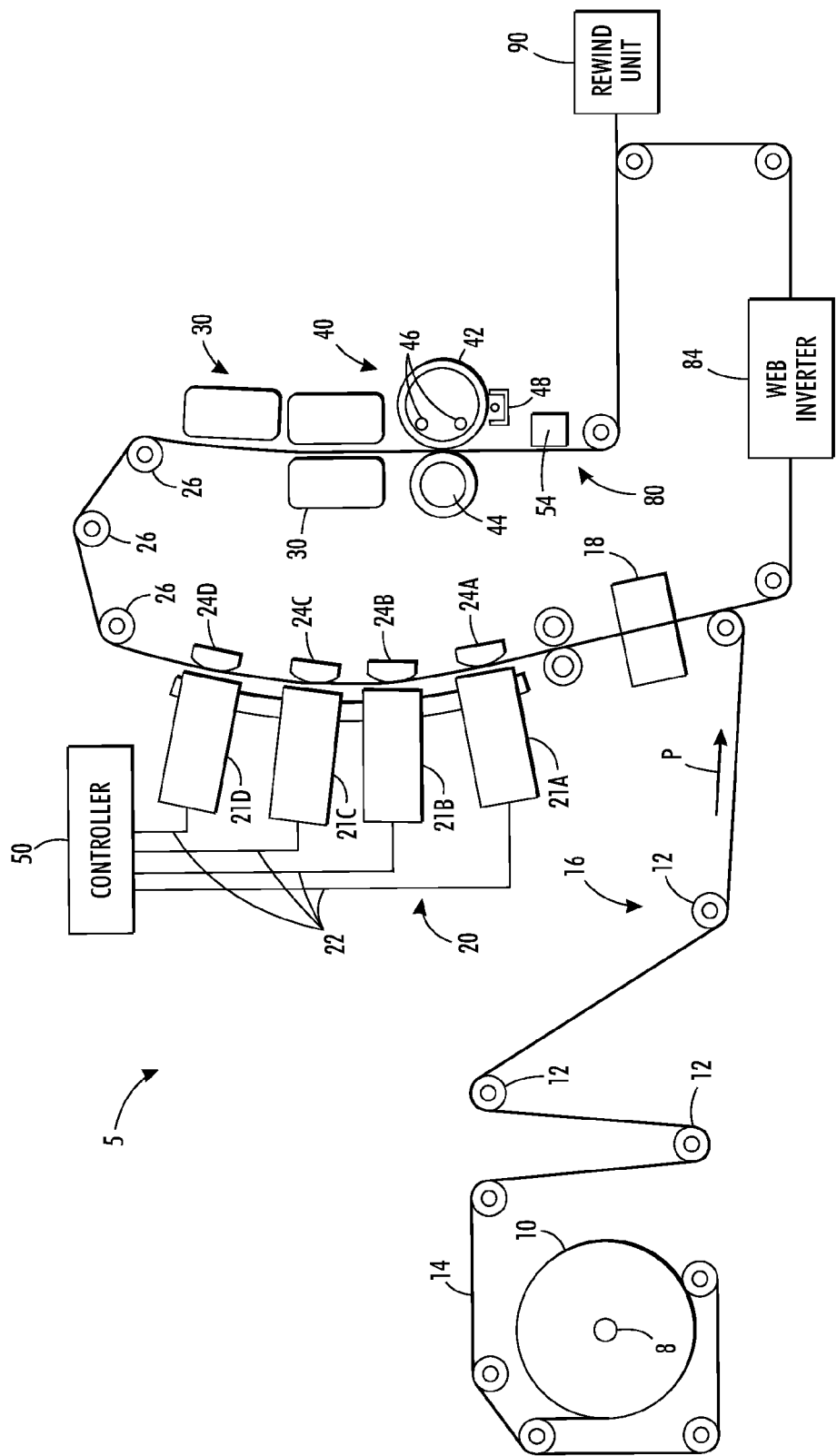
FIG. 10 is a schematic diagram of a prior art inkjet printer.

FIG. 10 is a simplified schematic view of the direct-to-sheet, continuous-media, phase-change inkjet printer 5, that is configured to generate test patterns using a plurality of printheads positioned in a print zone in the printer. A media supply and handling system is configured to supply a long (i.e., substantially continuous) web of media 14 of "substrate" (paper, plastic, or other printable material) from a media source, such as spool of media 10 mounted on a web roller 8. For simplex printing, the printer is comprised of feed roller 8, media conditioner 16, print zone or printing station 20, printed web conditioner 80, and rewind unit 90. For duplex operations, the web inverter 84 is used to flip the web over to present a second side of the media to the printing station 20 and printed web conditioner 80 before being taken up by the rewind unit 90. In the simplex operation, the media source 10 has a width that substantially covers the width of the rollers 12 and 26 over which the media travels through the printer. In duplex operation, the media source is approximately one-half of the roller widths as the web travels over one-half of the rollers in the printing station 20 and printed web conditioner 80 before being flipped by the inverter 84 and laterally displaced by a distance that enables the web to travel over the other half of the rollers opposite the printing station 20 and printed web conditioner 80 for the printing, conditioning, and coating, if necessary, of the reverse side of the web. The rewind unit 90 is configured to wind the web onto a roller for removal from the printer and subsequent processing.

The media can be unwound from the source 10 as needed and propelled by a variety of motors, not shown, rotating one or more rollers. The media conditioner includes rollers 12 and a pre-heater 18. The rollers 12 control the tension of the unwinding media as the media moves along a path through the printer. In alternative embodiments, the media can be transported along the path in cut sheet form in which case the media supply and handling system can include any suitable device or structure that enables the transport of cut media sheets along an expected path through the imaging device. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media are transported through a printing station 20 that includes a series of color units 21A, 21B, 21C, and 21D, each color unit effectively extending across the width of the media and being able to place ink directly (i.e., without use of an intermediate or offset member) onto the moving media. Each of the color units 21A-21D includes a plurality of printheads positioned in a staggered arrangement in the cross-process direction over the media web 14. As is generally familiar, each of the printheads can eject a single color of ink, one for each of the colors typically used in four color printing, namely, cyan, magenta, yellow, and black (CMYK). The controller 50 of the printer receives velocity data from encoders mounted proximately to rollers positioned on either side of the portion of the path opposite the four printheads to compute the position of the web as moves past the printheads. The controller 50 uses these data to generate timing signals for actuating the inkjets in the printheads to enable the four colors to be ejected with a reliable degree of accuracy for registration of the differently color patterns to form four primary-color images on the media. The inkjets actuated by the firing signals correspond to image data processed by the controller 50. The image data can be transmitted to the printer, generated by a scanner (not shown) that is a component of the printer, or otherwise electronically or optically generated and delivered to the printer. In various alternative embodiments, the printer 5 includes a different number of color units and can print inks having colors other than CMYK.

The printer 5 can use "phase-change ink," by which is meant that the ink is substantially solid at room temperature and substantially liquid when heated to a phase change ink melting temperature for jetting onto the imaging receiving surface. The phase change ink melting temperature can be any temperature that is capable of melting solid phase change ink into liquid or molten form. In one embodiment, the phase change ink melting temperature is approximately 70° C. to 140° C. In alternative embodiments, the ink utilized in the imaging device can comprise UV curable gel ink. Gel ink can also be heated before being ejected by the inkjets of the printhead. As used herein, liquid ink refers to melted solid ink, heated gel ink, or other known forms of ink, such as aqueous inks, ink emulsions, ink suspensions, ink solutions, or the like.

Associated with each of color units 21A-21D is a corresponding backing member 24A-24D, respectively. The backing members 24A-24D are typically in the form of a bar or roll, which is arranged substantially opposite the printhead on the back side of the media. Each backing member is used to position the media at a predetermined distance from the printhead opposite the backing member. Each backing member can be configured to emit thermal energy to heat the media to a predetermined temperature which, in one practical embodiment, is in a range of about 40° C. to about 60° C. The various backer members can be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media web 14 moves to receive inks of various colors from the printheads of the print zone 20, the printer 5 maintains the temperature of the media web within a given range. The printheads in the color modules 21A-21D eject ink at a temperature typically significantly higher than the temperature of the media web 14. Consequently, the ink heats the media. Therefore, other temperature regulating devices may be employed to maintain the media temperature within a predetermined range. For example, the air temperature and air flow rate behind and in front of the media may also impact the media temperature. Accordingly, air blowers or fans can be utilized to facilitate control of the media temperature. Thus, the printer 5 maintains the temperature of the media web 14 within an appropriate range for the jetting of all inks from the printheads of the print zone 20. Temperature sensors (not shown) can be positioned along this portion of the media path to enable regulation of the media temperature.

Following the print zone 20 along the media path, the media web 14 moves over guide rollers 26 to one or more "mid-heaters" 30. A mid-heater 30 can use contact, radiant, conductive, and/or convective heat to control a temperature of the media. Depending on the temperature of ink and paper at rollers 26, this "mid-heater" can add or remove heat from the paper and/or ink. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 is configured to apply heat and/or pressure to the media to fix the images to the media. The fixing assembly includes any suitable device or apparatus for fixing images to the media including heated or unheated pressure rollers, radiant heaters, heat lamps, and the like. In the embodiment of FIG. 10, the fixing assembly includes a "spreader" 40, that applies a predetermined pressure, and in some implementations, heat, to the media. The function of the spreader 40 is to take what are essentially droplets, strings of droplets, or lines of ink on web 14 and smear them out by pressure and, in some systems, heat, so that spaces between adjacent drops are filled and image solids become uniform. In addition to spreading the ink, the spreader 40 also improves image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web 14 to a temperature in a range from about 35° C. to about 80° C. In alternative embodiments, the fixing assembly can be configured to spread the ink using non-contact heating (without pressure) of the media after the print zone. Such a non-contact fixing assembly uses any suitable type of heater to heat the media to a desired temperature, such as a radiant heater, UV heating lamps, and the like.

In one practical embodiment, the roller temperature in spreader 40 is maintained at an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi lbs/side. Lower nip pressure gives less line spread while higher pressure may reduce pressure roller life.

The spreader 40 also includes a cleaning/oiling station 48 associated with image-side roller 42. The station 48 cleans and/or applies a layer of some release agent or other material to the roller surface. The release agent material can be an amino silicone oil having viscosity of about 10-200 centipoises. Only small amounts of oil are required and the oil carried by the media is only about 1-10 mg per A4 size page. In one possible embodiment, the mid-heater 30 and spreader 40 can be combined into a single unit, with their respective functions occurring relative to the same portion of media simultaneously. In another embodiment the media is maintained at a high temperature as it is printed to enable spreading of the ink.

Following passage through the spreader 40 the printed media can be wound onto a roller for removal from the system (simplex printing) or directed to the web inverter 84 for inversion and displacement to another section of the rollers for a second pass by the printheads, mid-heaters, and spreader. The duplex printed material can then be wound onto a roller for removal from the system by rewind unit 90. Alternatively, the media can be directed to other processing stations that perform tasks such as cutting, binding, collating, and/or stapling the media or the like.

Operation and control of the various subsystems, components and functions of the printer 5 are performed with the aid of the controller 50. The controller 50 can be implemented with general or specialized programmable processors that execute programmed instructions. The instructions and data required to perform the programmed functions are stored in memory associated with the processors or controllers. The processors, their memories, and interface circuitry configure the controllers and/or print engine to perform the functions, such as the difference minimization function, described above. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

The printer 5 includes an optical sensor 54 positioned after the print zone. In the printer 5 this sensor is after the spreader. In other embodiments it can be before the spreader and/or mid-heater. The optical sensor 54 is configured to detect, for example, the presence, reflectance values, and/or location of ink drops jetted onto the web media by the inkjets of the printhead assembly. In one embodiment, the optical sensor 54 includes a light source and a linear array of light detectors. The light source can be a single light emitting diode (LED) with a broad spectrum that is coupled to a light pipe that conveys light generated by the LED to one or more openings in the light pipe that direct light towards the image substrate. In one embodiment, three LEDs, one that generates green light, one that generates red light, and one that generates blue light are selectively activated so only one light shines at a time to direct light through the light pipe and be directed towards the image substrate. In another embodiment, the light source is a plurality of LEDs arranged in a linear array. The LEDs in this embodiment direct light towards the image substrate. The light source in this embodiment can include three linear arrays, one for each of the colors red, green, and blue. Alternatively, all of the LEDS are arranged in a single linear array in a repeating sequence of the three colors. The LEDs of the light source can be coupled to the controller 50 or some other control circuitry to activate the LEDs for image illumination.

The reflected light is measured by the optical detectors in optical sensor 54. The optical sensor, in one embodiment, is a linear array of photosensitive optical detectors, such as charge coupled devices (CCDs) or complementary metal oxide (CMOS) elements. In the printer 5, the optical sensor 54 includes a linear array of more than 12,000 photosensitive optical detectors that extend across the width of the media web 14. Each photosensitive optical detector detects light reflected from an area of the surface of the media web 14 that is approximately one pixel in size. As the media web 14 moves past the optical sensor 54, the optical sensor 54 generates successive lines of image data, referred to as scan lines, that the controller 50 assembles into a two-dimensional array of image data corresponding to a section of the length of the media web 14 in the process direction and the width of the media web 14 in the cross-process direction. Each of the optical detectors in the optical sensor 54 generates image data corresponding to a portion of the media web 14 opposite the detector. Thus, the position of ink drops or other markings in the cross-process direction can be identified with reference to the one or more optical detectors that detect light corresponding to the dashes or other markings on the media web 14.

Each of the photosensitive optical detectors in the optical sensor 54 generates an electrical signal corresponding to the amount of light received by the photosensitive device. The optical sensor 54 generates a plurality of reflectance values that correspond to each inkjet and/or to each pixel location on the receiving member from the light detected by each optical detector. In some embodiments, a bare media web 14 has a higher reflectance value and ink on the media web has a lower reflectance value. Different colors of ink can also have different reflectance values, with some embodiments of CMYK inks having a range of reflectance values ranging from the highest reflectance value with yellow ink, magenta ink, cyan ink, to black ink with the lowest reflectance value. The light sensor is configured to generate electrical signals that correspond to the reflected light and these signals are provided to the controller 50. The electrical signals can be used by the controller 50 to determine information pertaining to the ink drops ejected onto the receiving member as described in more detail below. Using the reflectance data, the controller 50 operates one or more actuators to adjust the positions of print bars and individual printheads in the print zone 1000 to register the printheads and enable high quality printing.

Figure 11:
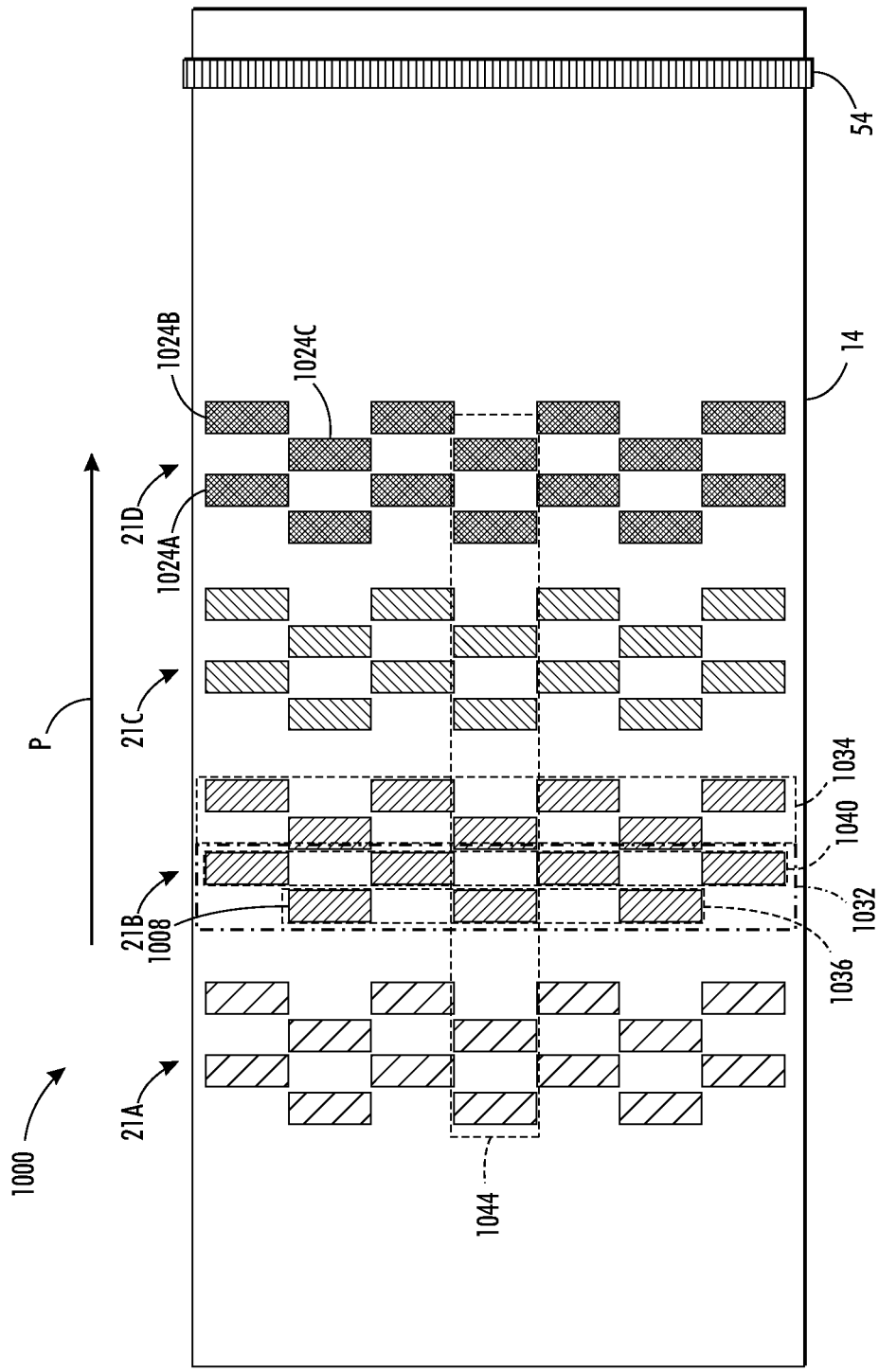
FIG. 11 is a schematic diagram of a prior art print zone including plurality of printheads.

FIG. 11 depicts a schematic view of a prior art print zone 1000 used in the printer 5 and including a plurality of printheads. The print zone 1000 includes the four color units 21A, 21B, 21C, and 21D arranged along a process direction P. Each color unit ejects ink of a color that is different than the colors of inks ejected in the other color units. In one embodiment, color unit 21A ejects cyan ink, color unit 21B ejects magenta ink, color unit 21C ejects yellow ink, and color unit 21D ejects black ink. In the print zone 1000, each printhead includes a large number of inkjets that each eject individual drops of ink onto the image receiving member. In the embodiment of the print zone 1000, each printhead has inkjets arranged with a density of 300 jets per inch (JPI) in the cross-process direction to produce images with a resolution of 300 dots per inch (DPI). The inkjets in each printhead are formed in a fixed position relative to one another within each printhead. When an individual printhead moves in the cross-process direction during a printhead registration process, all of the inkjets in the printhead move in substantially the same manner.

The process direction P is the direction that an image receiving member moves as the image receiving member travels under the color unit from color unit 21A to color unit 21D. Each color unit includes two print arrays, each of which includes two print bars that each carry multiple printheads. For example, the printhead array 1032 of the magenta color unit 21B includes two print bars 1036 and 1040. Each print bar carries a plurality of printheads, as exemplified by printhead 1008. Print bar 1036 has three printheads, while print bar 1040 has four printheads, but alternative print bars can employ a greater or lesser number of printheads. The printheads on the print bars within a print array, such as the printheads on the print bars 1036 and 1040, are staggered to provide printing across the image receiving member at a first resolution.

The printheads on the print bars with the print array 1034 within color unit 21B are interlaced with reference to the printheads in the print array 1032 to enable printing in the colored ink across the image receiving member in the cross process direction with double the resolution of a single printhead. With individual printheads that print at a resolution of 300 DPI, the interlaced configuration in each color unit 21A-21D enables printing at a resolution of 600 DPI. The print bars and print arrays of each color unit are arranged in this manner. One printhead array in each color unit is aligned with one of the printhead arrays in each of the other color units. The other printhead arrays in the color units are similarly aligned with one another. Thus, the aligned printhead arrays enable drop-on-drop printing of different primary colors to produce secondary colors. The interlaced printheads also enable side-by-side ink drops of different colors to extend the color gamut and hues available with the printer.

The printheads in print zone 1000 are registered with each other in both series alignment and stitch alignment. Series alignment refers to an alignment of a single column of printheads from each of the color units 21A-21D in the process direction P. For example, the printheads depicted in box 1044 in the print zone 1000 are each aligned in series to enable the printheads to print cyan, magenta, yellow, and blank inks in the correct cross-process locations on a media web. In proper series alignment, a corresponding inkjet in each set of printheads in the series can eject an ink drop onto the same cross-process location on the media web to enable the series printheads to form multi-color images. Stitch alignment refers to proper end-to-end alignment of each printhead array extending in the cross-process direction across the print zone 1000. For example, the printheads in printhead array 1032 are aligned in stitch alignment so that the inkjet at one end of each printhead in the cross-process direction ejects ink drops onto a pixel location that is evenly spaced from the pixel location of the inkjet at the end of a neighboring printhead in the staggered printhead array 1032. In proper stitch alignment, the printheads in the printhead array can form a single line of ink drops in the cross-process direction across the media web with a uniform distance separating each ink drop in the cross-process direction. A printhead registration process aligns all the printheads in print zone 1000 in both series alignment and stitch alignment. Part of the registration process to move the printheads into series and stitch alignment includes identifying the cross-process positions of each printhead in the print zone as described in process 100. Since even comparatively small misalignments on the order of tens of microns can negatively affect image quality, process 100 identifies the cross-process positions of each printhead with sufficient precision to enable the series and stitch alignment processes to identify and correct errors in printhead positions.

Figure 8:
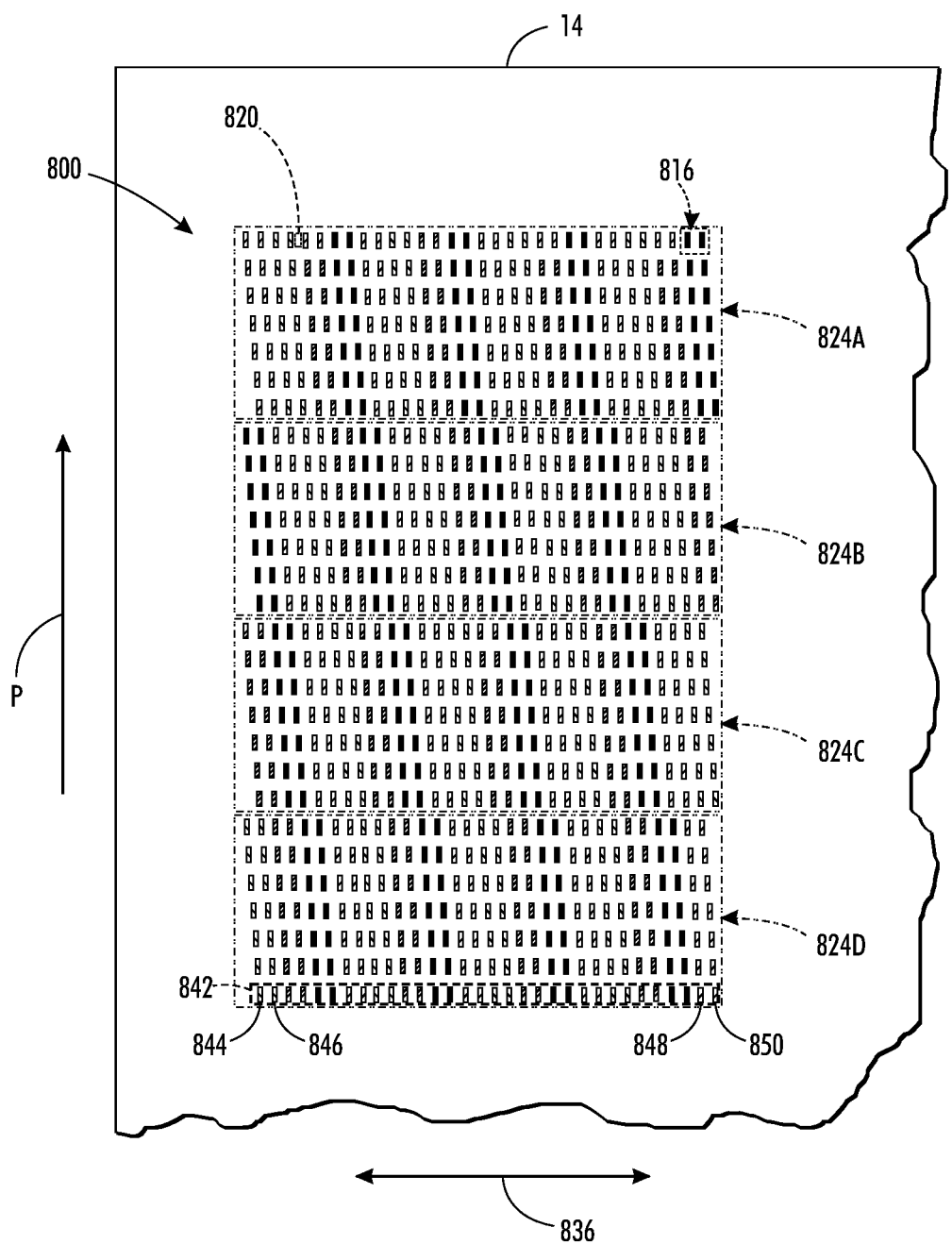
FIG. 8 is a front view of a prior art test pattern printed on an image receiving member.

Referring again to FIG. 1, a controller configured with programmed instructions and appropriate electronic components to implement process 100 begins by ejecting ink drops from each of the inkjets in the print zone 1000 to form a test pattern on the media web 14 (block 104). As used in this document, a reference to a process performing or doing some function or event refers to a controller configured to implement the process performing the function or event or operating a component to perform the function or event. A portion of an exemplary test pattern 800 formed on the media web 14 is depicted in FIG. 8. The test pattern 800 includes a series of rows of dashes, where each dash is formed by a single inkjet in one printhead in the print zone 1000. In the example configuration of the print zone 1000, a total of fifty-six printheads are arranged in the interlaced configuration described above. The test pattern 800 includes dashes formed by inkjets in each of the printheads in the print zone 1000.

Each row depicted in FIG. 8 includes dashes formed by a predetermined number of inkjets in each printhead in the print zone. The dashes shown in FIG. 8 are arranged in pairs that are printed by two printheads in series alignment that are configured to print a single color of ink. As depicted in FIG. 8 and FIG. 11, the dash pair 816 includes two dashes printed by inkjets in black printheads 1024A and 1024B in the color unit 21D of printer 5. When all of the printheads are correctly registered, each pair of dashes are separated by a predetermined dash period 820 that corresponds to a width of seven pixels on the media web 14 in the cross-process axis 836. The dash period distance 820 is a cross-process distance that separates neighboring dashes in a single row of dashes in the test pattern 800. The dash period 820 corresponds to the cross-process direction distance between dashes formed by two different printheads that are correctly aligned in series registration in the print zone. The inkjets in each printhead that generate the dash pairs are offset from each other in the cross-process direction, with the example of FIG. 8 placing seven pixels between the inkjets that form each dash pair. Each row of the test pattern 800 includes an alternating series of dash pairs from selected inkjets in each printhead in the print zone. In a four color printer, each row of dashes includes alternating sets of dashes for each of the four colors, such as the cyan, magenta, yellow, and black dashes that repeat through each row in the test pattern 800. Thus, each row of dashes in the test pattern 800 is formed from $\frac{1}{7}^{th}$ of the inkjets in each printhead formed in a series of 4 alternating segments 824A-824D of the image receiving member in the cross-process direction. In the configuration of test pattern 800, $\frac{1}{28}^{th}$ of the inkjets in each printhead form each row of dashes, and a total of 28 staggered rows of dashes as depicted in FIG. 8 include a dash formed from each inkjet in each printhead in the print zone. While test pattern 800 includes adjacent pairs of dashes formed by printheads that print the same color of ink, alternative test pattern arrangements alternate ink colors in a different order, such as a repeating CMYK or pseudo-random color order. Additionally, while each row of dashes in the test pattern 800 includes dashes formed by each printhead in the print zone, alternative test patterns include rows that only include marks formed by a subset of printheads in the print zone. Other embodiments print multiple test patterns where each test pattern includes marks formed by only a subset of the printheads in the print zone.

The portion of the test pattern 800 depicts a test pattern formed by printheads that are already registered in series and stitch alignment for illustrative purposes. During process 100, the positions of dashes in the test pattern vary from the arrangement depicted in FIG. 8 due to misregistration of the printheads and because some inkjets in the printheads may be inoperable. As described below, process 100 is configured to detect dashes in the test pattern and identify the printheads and individual inkjets that printed each dash when the printheads are misaligned and when some dashes are missing from the test pattern.

Process 100 continues by generating image data corresponding to the printed test pattern (block 108). In the printer 5, the optical sensor 54 generates a two dimensional arrangement of image data from a series of rows of pixels that correspond to a two dimensional area of the image receiving member that moves past the optical sensor 54. Each row of pixels in the image data is referred to as a scanline. The scanlines generated by the optical sensor 54 include each row of dashes in the test pattern 800. The controller 50 generates a two-dimensional array of image data from the individual scanlines of pixels. Process 100 then conducts a series of image analysis operations on the image data on a scanline-by-scanline basis for image data corresponding to each row of dashes in the test pattern.

Figure 2:
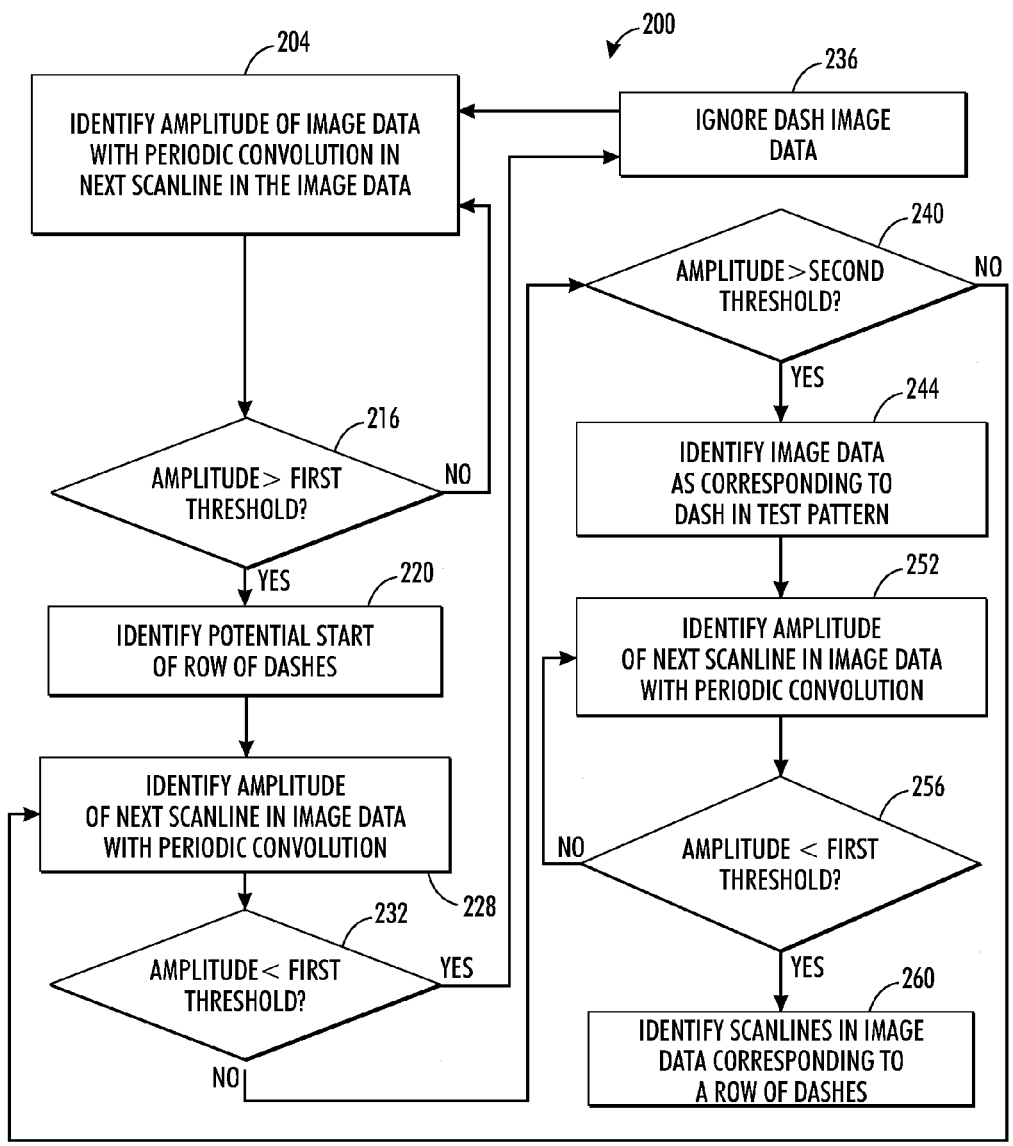
FIG. 2 is a block diagram of a process for identifying rows of dashes in a test pattern printed on an image receiving member.

After generating the image data corresponding to the entire test pattern 800, process 100 identifies scanlines in the image data that correspond to a single row of dashes formed on the image receiving member (block 112). FIG. 2 depicts a process 200 for identifying a row of dashes in the image data corresponding to the test pattern formed on an image receiving member. The printer 5 performs process 200 through stored program instructions executed by the controller 50 using the image data of the test pattern generated by the optical sensor 54. In the discussion below, a reference to the process performing a function or action refers to a controller executing programmed instructions stored in a memory to operate one or more components of the printer to perform the function or action. Process 200 identifies consecutive scanlines of pixels that correspond to a row of dashes in the image data. In each row of dashes, the length of each dash is typically several pixels long with some embodiments printing ten ink drops to form dashes that are ten pixels long in the process direction. In some embodiments, the arrangement of optical detectors in the optical sensor 54 produced image data having a resolution that is greater or less than the resolution of printed ink drops on the image receiving member. For example, the ten printed pixels could form dashes 5 or 20 pixels long in the image data. Variations between the registration of the printheads in the printer 5 and contaminants on the media web 14 can produce false image data. Process 200 identifies reflectance values in a series of successive scanlines of pixels to generate a two-dimensional array of pixels that correspond to each row of dashes in the test pattern, while reducing or eliminating noisy image data outside of each row of dashes.

Process 200 begins by identifying reflectance values for the image data in a single scanline of pixels. Process 200 convolves the image data with periodic functions having the periodicity at the predetermined dash period distance that separates adjacent dashes in each row of the test pattern (block 204). In one configuration, the process 200 convolves the image data in each scanline of pixels in the cross-process direction with a cosine and a sine function having a periodicity at the expected periodicity of the dashes in each row. The squares of the individual convolutions are then summed and compared to a predetermined threshold to detect the presence of a dash. As used in this document, "convolution" refers to the summation of the product of two functions. Thus, the summation of the product of the profile function and sine function is computed and the summation of the product of the profile function and cosine function is computed. As used in this document, the terms "sum," "summing," and "summation" all refer to mathematical operations in which input data are submitted to an algorithm that includes addition. The squares of the magnitudes of these two convolutions are then added to produce an image data amplitude that is compared to a first predetermined amplitude threshold (block 216). If the amplitude does not exceed the predetermined threshold, process 200 returns to block 204 to identify the amplitude of the image data in another scanline.

Another configuration of process 200 convolves the periodic functions with a series of smaller sections in the scanline to produce multiple individual convolutions across the scanline. As used herein, a "section" of a scanline refers to a continuous group of pixels in the scanline that include a number of pixels covering one or more predetermined dash periods, such as the seven pixel wide dash period in the example of test pattern 800. Since the actual cross-process direction distance between dashes formed by different printheads often deviates from the predetermined dash period distance, each section of the scanline identifies a small number of dashes. The scanline is divided into a series of sections that include all of the pixels in the scanline. Process 200 produces an image data amplitude for each section of the scanline, and the total sum of the amplitudes for the entire scanline are compared to the predetermined threshold amplitude.

When an amplitude of the convolution of a scanline in the image data exceeds the first predetermined amplitude threshold (block 216), then process 200 identifies the scanline as a potential start of a row of dashes (block 220). The first threshold is typically set low enough so that if a single, or small number of printheads print dashes on the image receiving member at a location that is ahead of the process direction locations of dashes printed by the remaining printheads in the print zone, then the dashes from each printhead in the print zone are detected. The first threshold is low enough, however, that a scanline that includes significant noise due to contaminants on the image receiving member may exceed the first threshold. Process 200 then continues to analyze image data for one or more successive scanlines of pixels (block 224), generate an amplitude for each scanline of image data with the periodic convolution (block 228), and compare the amplitude to the first amplitude threshold (block 232) in a similar manner to blocks 204-216 described above. Process 200 then compares the identified amplitude to a second, higher amplitude threshold (block 240).

If the identified amplitude of at least one scanline of image data exceeds the second amplitude threshold (block 240), then process 200 identifies the image data starting with the first scanline identified by the processing in block 216 as including a row of dashes printed on the image receiving member (block 244). Process 200 continues to process successive scanlines of image data to identify the end of the row of dashes in the process direction. Process 200 analyzes image data for an additional scanline of image data (block 248), identifies the amplitude of the image data (block 252), and compares the generated amplitude of the image data to the first predetermined threshold (block 256) in an iterative manner until the identified amplitude of a scanline in the image data fall below the first threshold. Process 200 then identifies a two-dimensional arrangement of image data including the scanlines of image data corresponding to the row of dashes beginning with the first scanline identified in block 220 and ending with the final scanline of image data that had an amplitude exceeding the first threshold value (block 260). Process 200 is performed to identify image data corresponding to each row of dashes in a test pattern.

Figure 9:
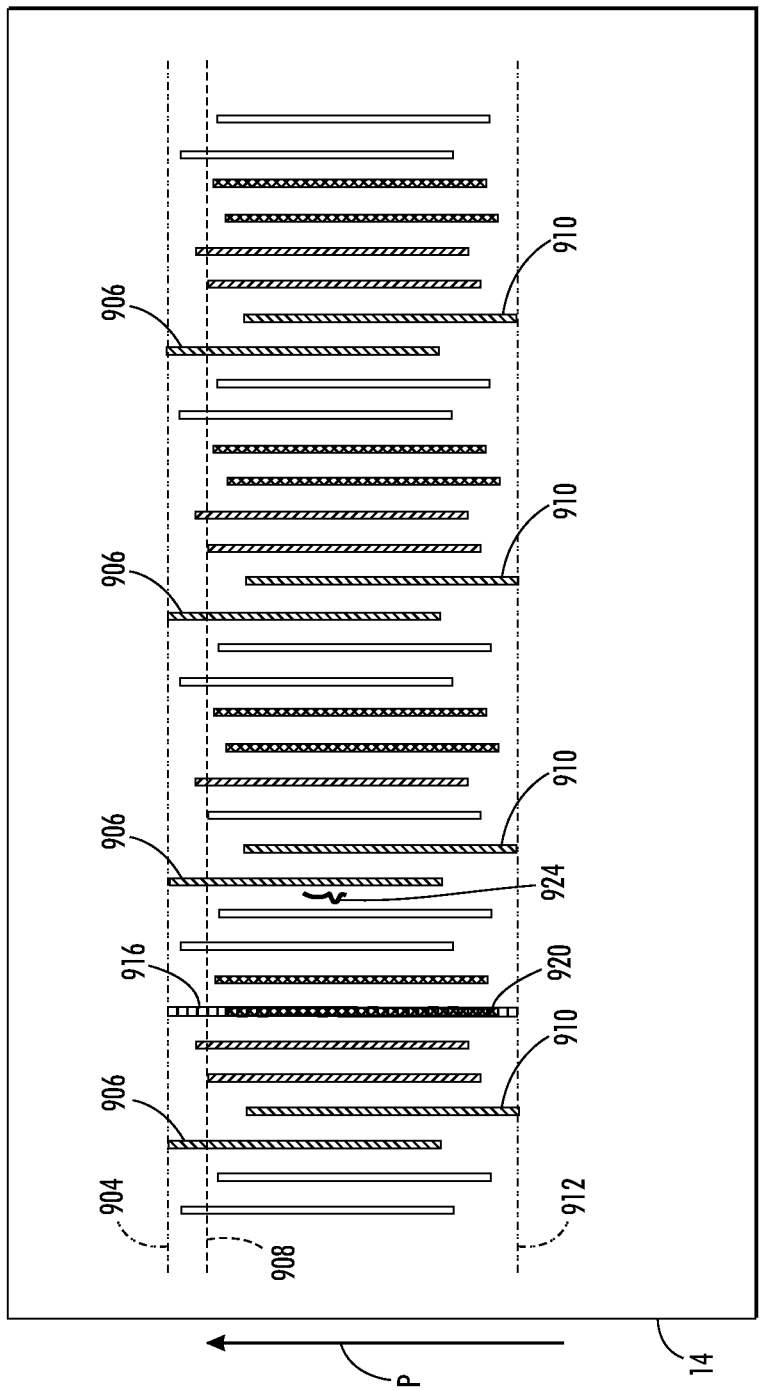
FIG. 9 is a view of a portion of one row of dashes in a prior art test pattern printed on an image receiving member.

The first and second thresholds identify a series of pixels corresponding to a single row of dashes under conditions where the process direction locations of dashes vary due to process-direction misalignment of the printheads in the print zone. FIG. 9 depicts a portion of one row of dashes that exhibit misalignment in the process direction P. The first threshold is exceeded in response to a single scanline 904 including image data received from multiple dashes. Some of the dashes, such as dashes 906A and 906B, may extend past the scanline that marks the beginning of the identified row of dashes. The second threshold is exceeded when a greater number of dashes are present in the scanline, depicted as scanline 908 in FIG. 9. The first threshold may be exceeded intermittently due to contaminants on the image receiving member that generate apparent indications of dashes, but the first and second thresholds are only exceeded when the image data include a row of dashes. The first and second thresholds may be exceeded in a single scanline when the printheads in the print zone are aligned in the process direction and the corresponding row of dashes is aligned in the process direction. In FIG. 9, the first amplitude threshold is exceeded at scanline 904, which includes dashes 906 printed by a single printhead. The second threshold is exceeded when multiple printheads print dashes that overlap in the process direction, as depicted in scanline 908 in FIG. 9. The image data continue to exceed the first threshold until scanline 912, which corresponds to the ends of dashes 910 that are printed by a trailing printhead in the print zone. The value of the first threshold is sufficiently low to enable process 200 to identify each of the dashes, and the value of the second threshold is sufficiently high to prevent process 200 from misidentifying a row of dashes with varying process-direction positions as two or more rows of dashes.

Figure 3:
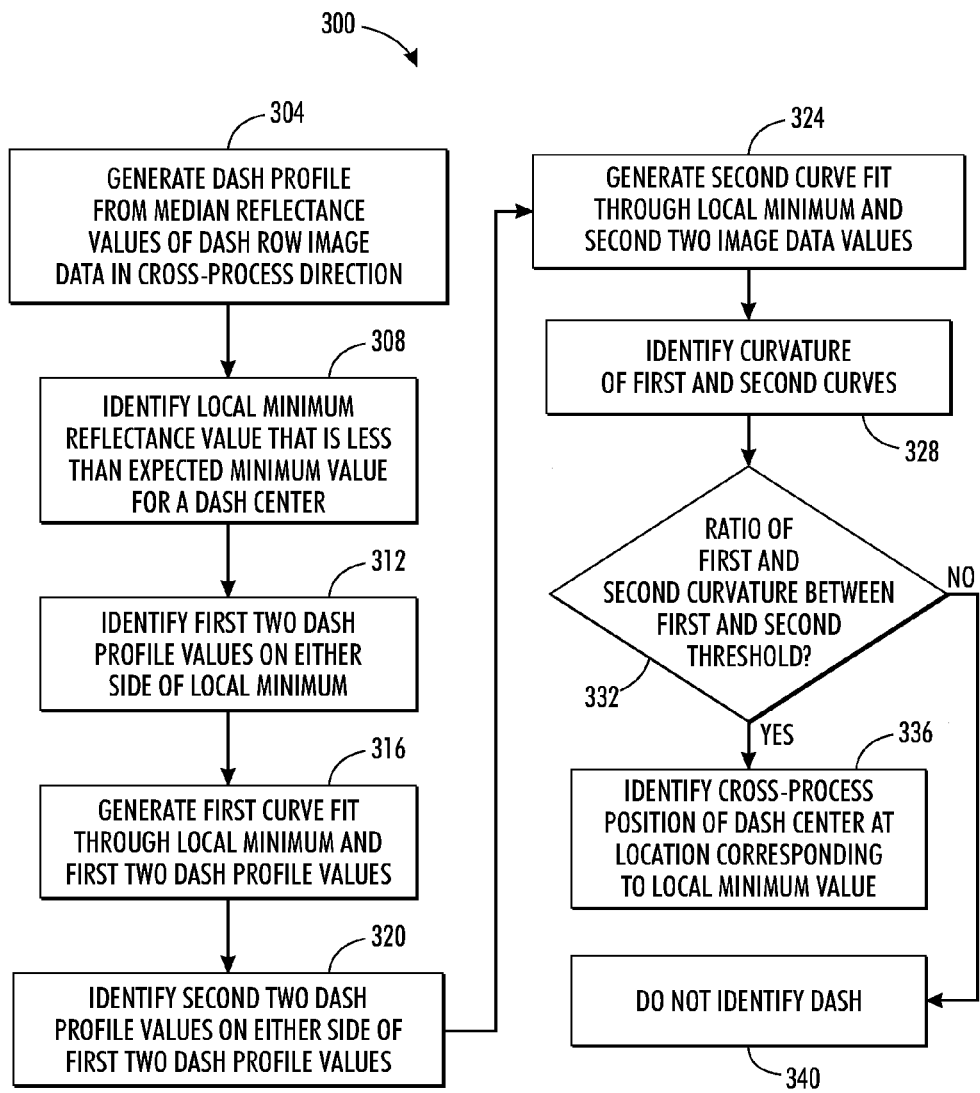
FIG. 3 is a block diagram of a process for identifying a cross-process direction position of a dash in image data corresponding to a row of dashes in the test pattern.

Referring again to FIG. 1, process 100 continues by identifying dash profiles and the cross-process position of dash centers in the image data corresponding to the row of dashes (block 116). As used herein, the terms "dash center" and "center" refer to the portion of the dash having the greatest identified difference between the reflectance values of the dash and the underlying image receiving member in the image data. The dash center is located a position within a dash formed on the image receiving member or the image data corresponding to the dash that is approximately half-way between the leftmost ink in the dash and the rightmost ink in the dash in the cross-process direction. Process 100 identifies the center of each dash as a cross-process direction location that is within the portion instead of the edges of the dash to improve the accuracy of identification of the cross-process direction location of each dash. The image data corresponding to each row of dashes identified includes a plurality of individual dashes arranged in the cross-process direction. The identification of the dash centers in the image data is depicted in more detail in process 300 of FIG. 3. The printer 5 performs process 300 through stored program instructions executed by the controller 50. Process 300 operates on the image data corresponding to a single row of dashes generated in process 200. Process 300 identifies the cross-process position of each dash in a series of scanlines that includes a single row of dashes.

Figure 4A:
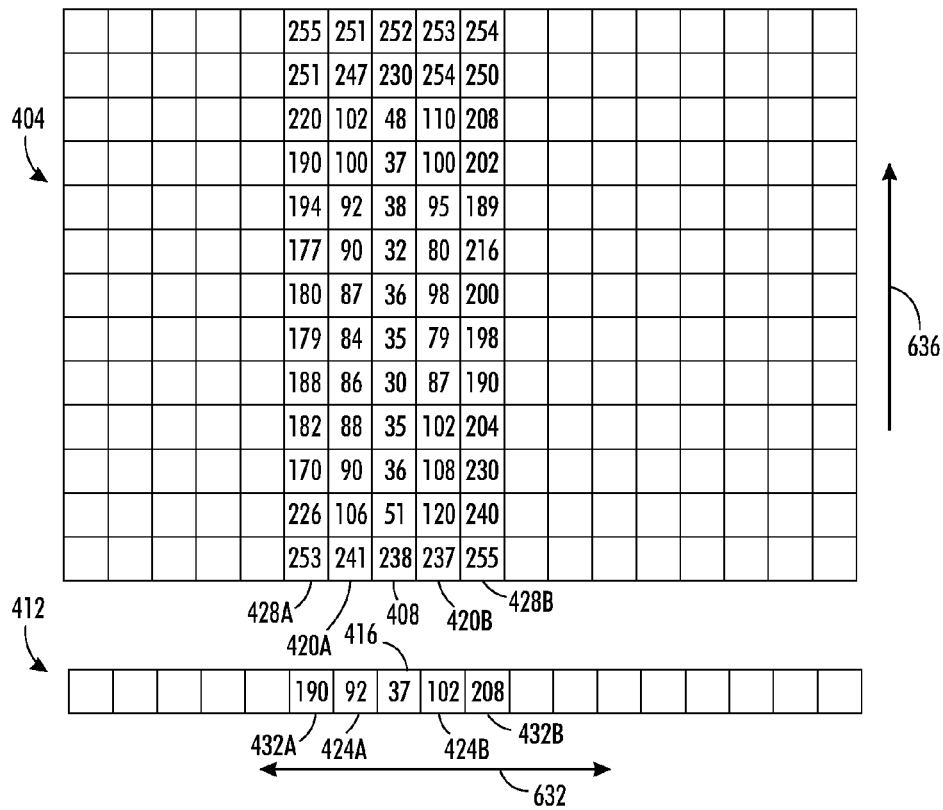
FIG. 4A is a representation of reflectance values corresponding to image data of a dash formed on the image receiving member.

Process 300 begins by generating a one-dimensional dash profile for the row of dashes that includes the median reflectance value of each column of image data in the process direction (block 304). As used herein, a "median" image data value refers to a numeric value that is in the middle of an upper half and a lower half of a range of image data values, such as a column of image data values or image data values associated with a single dash in the test pattern. As depicted in FIG. 4A, the image data corresponding to a single row of dashes is depicted as a two-dimensional arrangement of pixels 404 arranged in scanlines along the cross-process axis 836 and extending in columns in the process direction P. An individual column of pixels 408 includes a series of numeric reflectance values with each value corresponding to a pixel in each scanline of the two dimensional image data set. Process 300 generates a dash profile 412 that includes a median value of the image data in each of the columns in the image data 404. For example, the dash profile 412 includes a median value of 36 at reference 416 corresponding to column 408 in the image data 404.

Image data values near either end of the columns that contain dashes often have reflectance values that are closer to the underlying image receiving member than the ink forming the dash. Additionally, when printheads are offset from each other in the process direction the columns of image data extracted by process 200 are longer than the dashes, leading to extra pixels of the underlying image receiving member at the start and/or end of each dash in the process direction. As depicted in FIG. 9, a column of pixels 916 in the image data corresponding to a single dash 920 as identified in process 200 also includes pixels that correspond to the underlying image receiving member 14 due to the distribution of locations of the dashes in the process direction. In FIG. 4A, columns 420A, 408, and 42B each include pixels having high numerical reflectance values that correspond to the image receiving member instead of the ink dash.

The dash profile 412 includes the median value of the image data for each column in the image data 404 instead of a mean value to reduce the effect of image data values that correspond to the image receiving member in the image data on the dash profile value for each column of pixels. When the length of each dash is greater than the process direction variation between other dashes in the row of the test pattern, then the majority of pixels within a column have reflectance values corresponding to the ink drops in the dash, rather than the image receiving member. The dash profile 412 includes the median image data value for each column in the image data corresponding to the row of dashes.

Process 300 continues by identifying local minima in the numeric values of the dash profiles to identify potential locations of dashes in the cross-process direction (block 308). Various methods of identifying local minima can be used to identify the potential dash locations in the dash profile data. One exemplary method identifies a local minimum in the dash profile data whenever two median values are positioned on either side of a lower-valued central median value. The lower-valued central median value has a reflectance value that is below a reflectance threshold value expected for an ink dash. That is to say, the central median reflectance value in the image data corresponds to a reflectance value of an ink dash, which has a comparatively lower reflectance value than the reflectance value of the underlying image receiving member.

Referring again to FIG. 4A, the dash profile value at reference 416 is a local minimum value of 36 between dash profile references 424A and 424B having values 90 and 99, respectively. Process 300 identifies a plurality of local minima in the dash profile data 412 corresponding to potential dashes.

Figure 4B:
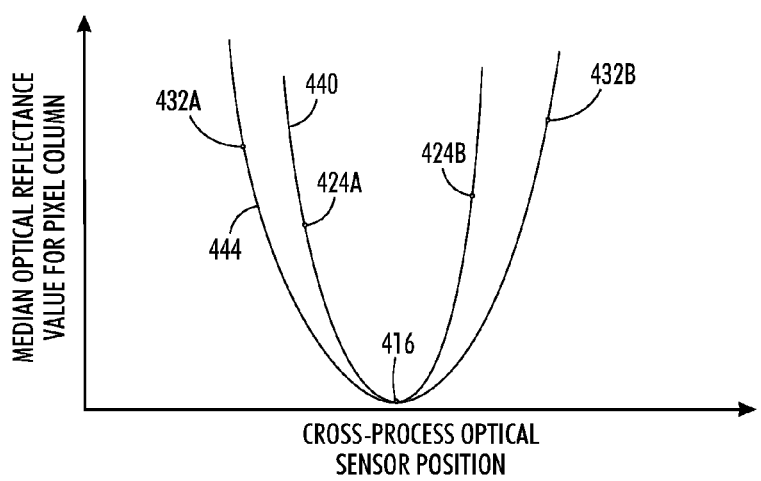
FIG. 4B is a graph of two curve fits formed through reflectance values of FIG. 4A.

Each identified local minimum in the dash profile data represents a potential location of a dash in the dash profile 412. Contaminants on the surface of the image receiving member and stray ink drops can, however, generate a local minimum in the dash profile where no actual dash exists in the image data. Process 300 generates two curves fit through the dash profile data 412 to reduce the likelihood of misidentification of a dash. In one embodiment, process 300 generates a quadratic curve fit, although other curves and splines can be used as well. Process 300 identifies the two dash profile values on either side of the identified local minimum value in the dash profile data (block 312) and generates a curve fit of the three dash profile values (block 316). Referring to FIG. 4A and FIG. 4B by way of example, process 300 identifies values of adjacent dash profile references 424A and 424B on either side of the local minimum value at reference 416. FIG. 4B depicts a quadratic curve 440 fit through the three values. Process 300 also identifies a second pair of dash profile values on either side of the dash profile values used for the first curve fit in the cross-process direction (block 320), and generates a second curve fit through the second pair of dash profile values and the local minimum value (block 324). In the example of FIG. 4A and FIG. 4B, process 300 identifies the dash profile values at references 432A and 432B, and generates a second quadratic curve fit 444 through the values of the dash profiles at references 432A, 432B, and at the local minimum at reference 416.

Process 300 identifies a curvature value for each of the generated curves (block 328). The curvature for the quadratic curve 400 is identified with the following equation:

$$A_1 = \frac{(lpfid_{min-1} + lpfid_{min+1} - 2lpfid_{min})}{2}$$

where $lpfid_{min-1}$, $lpfid_{min+1}$, and $lpfid_{min}$ are the dash profile values at dash profile references 424A, 424B, and 416, respectively. The curvature of the second curve 444 is identified with the following equation:

$$A_2 = \frac{(lpfid_{min-2} + lpfid_{min+2} - 2lpfid_{min})}{2}$$

where $lpfid_{min-2}$, $lpfid_{min+2}$, and $lpfid_{min}$ are the dash profile values at references 432A, 432B, and 416, respectively.

Process 300 identifies a ratio of the curvatures $A_1$ and $A_2$, $$A_{rat} = \frac{A_1}{A_2}$$

(block 328). The ratio of the two curves $A_{rat}$ is then compared to a predetermined range of ratios (block 332) to determine if the identified cross-process location of the local minimum value corresponds to a center of a dash (block 336) or if the local minimum is a noise value that should be ignored (block 340). In one embodiment, the range of ratios $A_{rat}$ that correspond to dashes in the dash profile data are between approximately 1.5 and 3.0. Values of $A_{rat}$ below 1.5 may indicate two dashes that are merged together due to misalignments of two different printheads, and are ignored to increase the accuracy of identification of individual dashes. Values of $A_{rat}$ below 1.5 or above 3.0 can also be caused by paper fiber, or other contaminants, which typically have widths and curvature rations that differ from a printed dash.

Process 300 identifies a cross-process direction location of the center of each dash in image data corresponding to a single row of dashes as described above. Process 300 can be performed for image data corresponding to each row of dashes in a test pattern such as test pattern 800 of FIG. 8. The reader should note that alternative embodiments can use reflectance values that increase to a local maximum instead of a local minimum at locations corresponding to a potential dash, and that an alternative embodiment of process 300 identifies dashes in a similar manner using curves fitted through local maxima instead of local minima in the dash profile data.

Figure 5A:
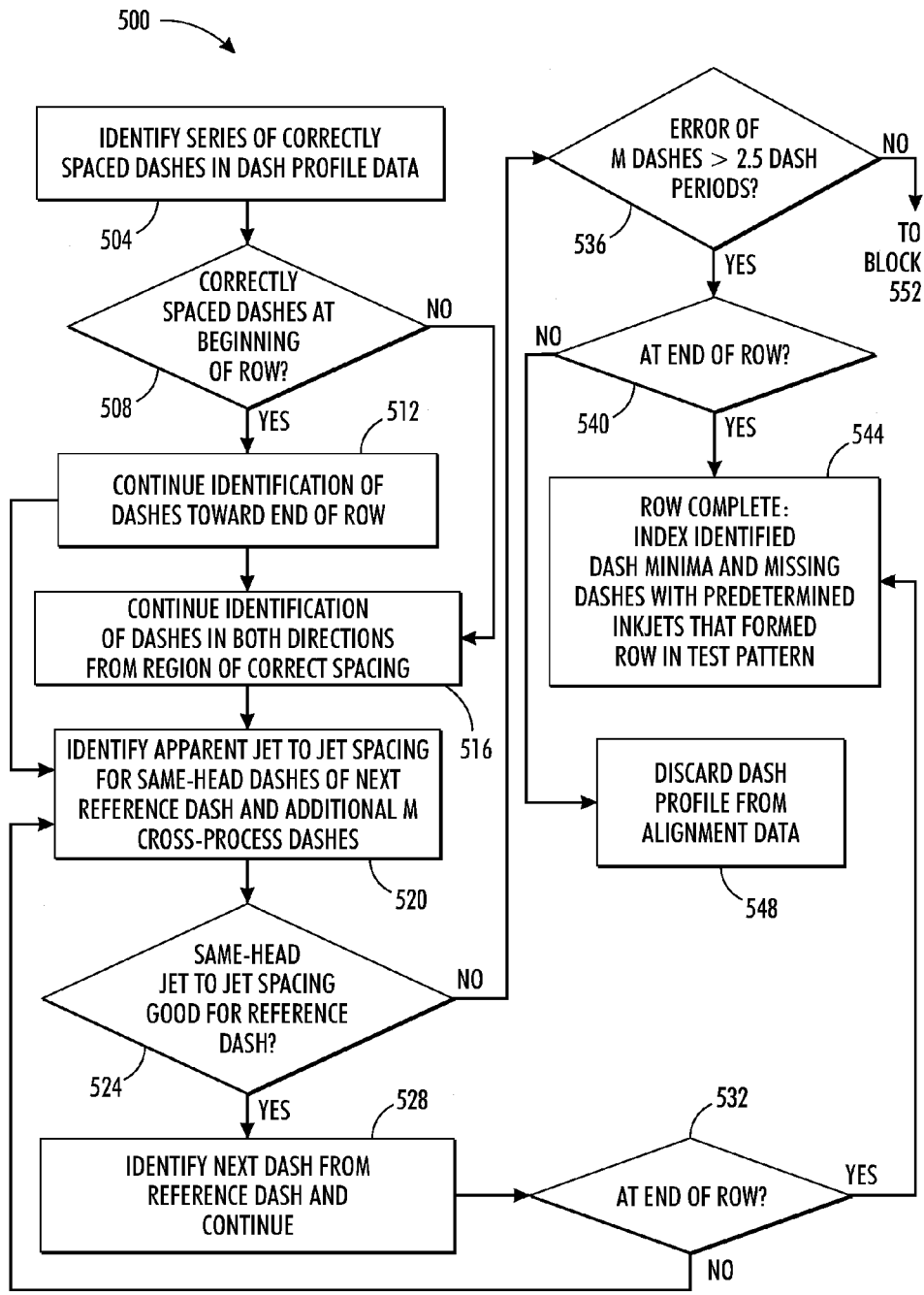
FIG. 5A and FIG. 5B are a block diagram of a process for identifying missing dashes in image data corresponding to a row of dashes and for associating dashes in the image data with printheads in the printer.
Figure 5B:
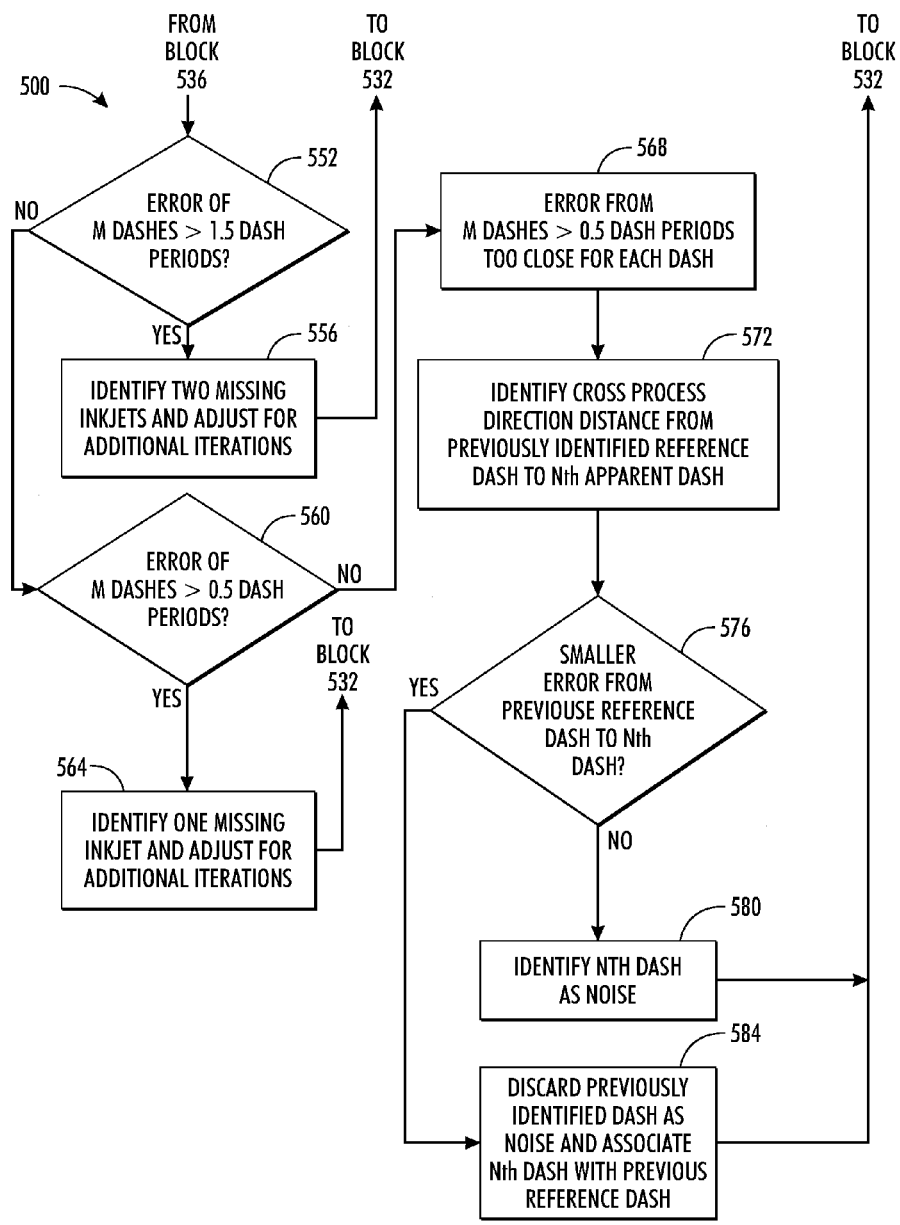

After identification of cross-process locations of dashes in the dash profile data, process 100 identifies inoperable inkjets in one or more of the printheads that printed each dash in the row of dashes of the test pattern (block 120). Part of the identification includes identifying missing dashes in each row of dashes in the test pattern, and eliminating false dash minima in the dash profile that are generated by contaminants or other sources of noisy image data. During printing of the test pattern, some of the inkjets in the print zone may fail to eject ink drops, or may eject ink drops onto an incorrect location on the image receiving member. An inkjet that fails to produce a dash on the image receiving member is referred to as a missing inkjet. Block 120 in process 100 is depicted in more detail in process 500 of FIG. 5A and FIG. 5B. Process 500 identifies missing dashes in a single row of dashes in a test pattern. Process 500 is described with reference to example segments of dash rows depicted in FIG. 7A-FIG. 7E. The printer 5 performs process 500 through stored program instructions executed by the controller 50. Process 500 operates on the dash profile data generated in process 300 above for a single row of dashes.

Process 500 begins by identifying a section of the row that does not contain any missing jets or stray marks/noise. Process 500 identifies the area of well-spaced dashes by identifying the cross-process direction distances between a series of dashes that are printed by a single printhead in the row of the test pattern. The inkjets in a single printhead are fixedly arranged in a face of the printhead, and the variation in cross-process direction between dashes formed by a single printhead is typically much smaller than the variation between dashes that are printed by multiple printheads. As used herein, the term "expected distance" between two dashes in a test pattern that are formed by a single printhead refers to a predetermined cross-process direction distance between the two inkjets in the single printhead that form the two dashes on the image receiving member. As noted above, the cross-process direction distance between neighboring dashes that are printed by different printheads varies due to head-to-head spacing variation.

Figure 7A:
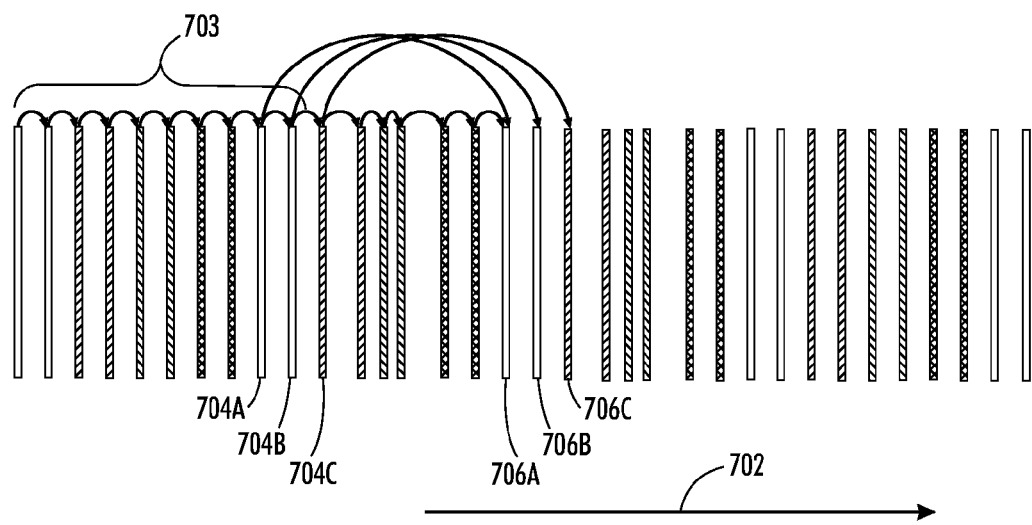
FIG. 7A is a front view of a row of dashes in a test pattern.

Process 504 identifies the spacing between the center of a reference dash and the center of the Nth dash, where N is the index of the next dash in the row printed from the same printhead as the reference dash. In FIG. 7A, a single printhead forms reference dashes 703A and 704A, which are separated by the expected distance for inkjets in a single printhead in the cross-process direction 702. If the cross-process direction distance between the reference dash and the Nth dash is within a predetermined threshold of an expected distance for two inkjets in a single printhead, then the reference dash 703A and the next dash 704A indicate that region of the row of dashes include properly spaced dashes. Process 500 optionally checks the spacing between one or more additional pairs of dashes that are formed by another printhead to eliminate potential errors due to noise in the image data. For example, if the cross-process direction distance between reference dash 703B and the corresponding Nth dash 704B is also within the predetermined threshold of the expected distance, then process 500 identifies that the dashes 704A and 704B are correctly spaced in the row of dashes. If the distance between the reference dash and the Nth dash does not correspond to the expected cross-process distance between dashes formed by a single printhead, then process 500 continues to identify the distance between another reference dash and corresponding Nth dash in the row of dashes until reaching a region with correctly spaced dashes in the image data with no missing dashes or stray marks.

In one configuration, the number of consecutively spaced dashes required is selected to be the number of dashes printed from each printhead in the print zone before a single printhead prints another dash. For example, in the test pattern 800, each set of eight consecutive dashes in each row of dashes includes a dash formed by one inkjet in each of eight printheads arranged in the print zone in areas of the test pattern that do not include missing inkjets. Process 500 identifies a set of eight dashes in each row that are correctly spaced as a starting point for identifying missing dashes in the rest of the dash profile. In the printer 10, the controller 50 executes stored program instructions to identify the cross-process direction distances that separate the dash centers in the dash profile data and identifies missing dashes in each row of dashes in the test pattern.

In some dash profile data, the dash profiles at the beginning of each row are correctly spaced (block 508) and process 500 continues in the cross-process direction to identify missing ejectors in the dash profile data (block 512). In other dash profile data, the cross-process positions of dashes in the dash profile are not correctly spaced at the beginning of the row and process 500 identifies the correctly spaced series of dashes within the dash profile (block 508). When the correctly spaced series of dashes are identified within the dash profile, process 500 identifies missing dashes beginning with the identified set of correctly spaced dashes and extending in both directions across the dash profile (block 516). In some embodiments, process 500 "flips" or reverses the orientation of the dash profile data starting at the beginning of the dash profile and ending at the set of correctly spaced dashes to position the set of correctly spaced dashes at the first end of the dash profile. Process 500 continues as described below until returning the dash profile data to the original configuration after identifying missing dashes in the first section of the dash profile. In another embodiment, process 500 identifies missing dashes beginning from the set of correctly spaced dashes in either direction along the cross-process direction.

In a configuration where all of the printheads in the print zone are already registered to have proper series alignment and stitch alignment, a detection process can identify weak or missing inkjets simply by identifying larger than expected gaps between adjacent dashes in the dash profile data. Process 500, however, analyzes dash profile data of a test pattern that is generated using printheads that are not registered in series and stitch alignment. When analyzing the dash profile data from misregistered printheads, a process using adjacent dash spacing falsely indicates weak or missing inkjets. Process 500 improves the accuracy of detection of weak or missing inkjets by measuring the spacing between dash centers corresponding to dashes formed by inkjets in a single printhead instead of comparing adjacent dashes formed by different printheads that can be misaligned. Since the inkjets in a single printhead are arranged in a fixed array, the relative cross-process direction distance between dashes formed by the single printhead has a much lower variability than dashes formed by different printheads. Process 500 identifies missing dash centers and noise in the dash profile data with reference to the cross-process direction distance between inkjets of individual printheads to enable identification of the printheads that form each dash on the image receiving member and to identify weak or missing inkjets in the printheads.

Once process 500 identifies a set of correctly spaced dashes in the dash profile data, process 500 begins identifying the cross-process distance separating dashes formed by the same printhead (block 520). To improve accuracy in identifying dash centers, process 500 measures the cross-process distance between dash centers of multiple (M) adjacent dashes starting with a reference dash and including at least one adjacent dash in the cross-process direction. In one example, the value of M is three and process 500 identifies the cross-process direction distance between the dash centers of three adjacent dashes and dash centers corresponding to three corresponding dashes printed by the same printheads in the dash profile data that printed the three adjacent dashes. In the M dashes, the dash that is closest to the series of correctly spaced dashes identified in block 504 is referred to as the "reference dash."

FIG. 7A depicts an example of dashes in one row of dashes from the test pattern 800 as used in process 500. As depicted in FIG. 7A, dash 704A is a reference dash, and the three dashes 704B and 704C are one set of M dashes used to identify inkjets corresponding to dash centers in the dash profile data. The reference dash 704A is the closest dash to a group of correctly spaced dashes 703 in the cross-process direction 702. In the embodiment of test pattern 800, a single printhead prints every eighth dash, and process 500 identifies the next dash from the same printhead as the reference dash 704A by identifying the dash centers corresponding to the next eight dashes in the cross-process direction 702.

In FIG. 7A, the first seven dashes in the next eight are formed by different printheads, and in some configurations can be arranged with uneven spacing in the cross-process direction 702. The eighth dash 706A, however, is formed by the same printhead that formed the reference dash 704A, and the spacing between the reference dash 704A and 706A remains within a predetermined threshold distance of eight dash periods, regardless of the variances of spacing of the intermediate dashes. Similarly, the dashes 704B and 704C are also separated from corresponding dashes 706B and 706C by a cross-process direction distance of eight dash periods. The dashes depicted in FIG. 7A-7E are for illustrative purposes only. In process 500, the controller 50 identifies the cross-process direction positions of each dash and distances between dash profile centers using the array of dash profile centers generated in process 300 described above.

As depicted in FIG. 11, printheads in the print zone are staggered in a cross-process direction across a width of the media web 14. At a transition between printheads, the cross-process direction distance between a reference dash and the Nth dash can deviate from the expected distance between inkjets in a single printhead due to alignment errors between the two printheads. The next two dashes in the group of three dashes, however, are not located at transitions between printheads. Instead, each of the next two dashes and the corresponding Nth dash is positioned within a single printhead in the print zone. For example, if reference dashes 704A and 706A are printed by inkjets in two different printheads, then dash pair 704B-706B is printed by inkjets in only one printhead. Further, dashes 704C-706C are printed by inkjets in only one other printhead. Consequently, a variation in the cross-process direction spacing between dashes 704A and 706A does not affect the cross-process direction spacing between dash pairs 704B-706B and 704C-706C. Process 500 can conclude, therefore, that dash 706A is a dash in the test pattern and not noise or a misidentified dash. Process 500 continues to identify dashes in the row that are printed by each of the printheads in the print zone.

Referring again to FIG. 5A and FIG. 5B, if the spacing of the reference dash to the next dash printed by the same printhead is within a predetermined threshold distance of the expected eight period dash separation (block 524), process 500 identifies that the next identified dash center corresponds to the next inkjet in the same printhead that formed the reference dash (block 528). In the example of FIG. 7A, process 500 identifies that the dash center for dash 706A is generated by another inkjet in the same printhead that printed the reference dash 704A. In one embodiment, the predetermined threshold distance is one-half of the expected dash period between two adjacent dashes in each row of dashes. Thus, process 500 identifies that dash centers for two dashes from the same printhead are correctly spaced if the dashes are separated by a cross-process distance of between 7.5 and 8.5 dash periods. If the Nth dash from the reference dash is not the final dash in a row of dashes (block 532), the next identified dash center in the dash profile data is selected as the next reference dash and process 500 continues to the processing described in block 520. Process 500 analyzes each dash beginning from the series of correctly spaced dashes. In FIG. 7A, process 500 selects dash 704B as the next reference dash in an additional iteration of the process 500. If the Nth dash from the reference dash represents the last dash center in the dash profile (block 532), then process 500 is completed (block 544) for the dash profile corresponding to the row of dashes.

Figure 7B:
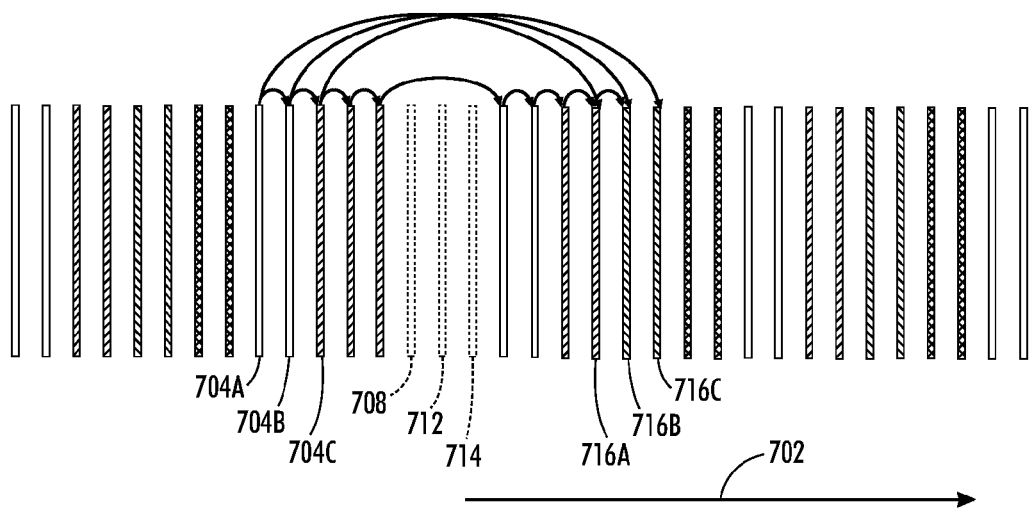
FIG. 7B is another front view of a row of dashes in a test pattern where three dashes are missing from a section of the row.

In one case, three or more dashes are missing from a row of dashes within a single series of eight dashes in a single row of a test pattern. The missing dashes correspond to three or more weak or missing inkjets in the printheads forming the row of dashes. FIG. 7B depicts one situation where dashes 708, 712, and 714 (shown in broken lines) are missing from the test pattern, and corresponding dash centers for the three missing dashes are absent from the dash profile data. Process 500 identifies the eighth dash 716A from the reference dash 704A (block 520), and identifies that the cross-process direction distance between the reference dash 704A and the eighth dash 716A is outside of the expected range (block 524) and that the error in the cross-process spacing exceeds 2.5 dash periods (block 536). In the example of FIG. 7B, the cross-process direction spacing between the reference dash 704A and the eighth dash 716A is approximately 11 dash periods instead of the expected eight dash periods. The increased spacing is due to the missing dashes 708, 712, and 714 that do not have dash centers present in the dash profile data. In one situation the first or last dash center does not belong to a dash, but instead belongs to an edge of the image receiving member. If the first or last dash center in a dash profile is offset by more than 2.5 dash periods (block 540), process 500 identifies the last dash center as an edge of the image receiving member, ignores the final dash center, and completes analysis of the row (block 544). Process 500 discards the dash profile data if three or more missing dashes are detected between the reference dash and the eighth dash prior to reaching the end of the row (block 548). The embodiment of process 500 described herein tolerates up to two consecutive missing dashes in dash profile data corresponding to a single row of dashes. In alternative test pattern embodiments a smaller or larger number of dashes are arranged between dashes formed by a single printhead, and process 500 can have a higher or a lower tolerance for missing dashes between dashes formed by a single printhead in the test pattern.

Figure 7C:
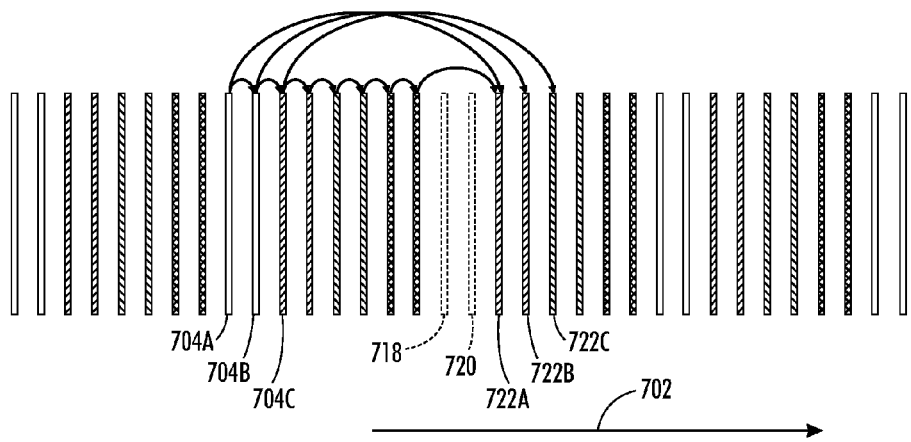
FIG. 7C is another front view of a row of dashes in a test pattern where two dashes are missing from a section of the row.

In a second case, the spacing between the reference dash and the next dash from the same printhead is not within the predetermined threshold (block 524), but the measured error is less than 2.5 dash periods (block 536) and greater than 1.5 dash periods for each of the M adjacent dashes (block 552). This situation occurs when the dash centers corresponding to two adjacent dashes are missing from the dash profile data. In FIG. 7C, the centers corresponding to two dashes 718 and 720 (shown in broken lines) are missing from the dash profile data immediately prior to the eighth identified dash 722A corresponding to the reference dash 704A. The identified dash centers for each of dashes 722A, 722B, and 722C are approximately two dash periods farther in the cross-process direction 702 compared to the expected cross-process distances from dashes 704A, 704B, and 704C, respectively.

When the identified error to each of the next M dashes is greater than 1.5 dash periods, process 500 identifies that dash centers corresponding to two dashes between the reference dash and the eighth measured dash are missing in the dash profile data, and adjusts for the missing dashes in subsequent iterations of process 500 (block 556). More particularly, process 500 identifies that the next inkjet from the printhead that generated the reference dash 704A and the next inkjet from the printhead that generated dash 704B are missing. Because process 500 begins identifying the spacing of dash centers starting from a predetermined region of correctly spaced dashes, the first occurrence of two missing dashes corresponds to the printhead that formed the reference dash 704A and the printhead that formed the next dash 704B.

Process 500 also adjusts for the missing dashes in subsequent iterations of the process (block 556). In the next iteration of process 500, dash 704B becomes the next reference dash but the missing dashes 718 and 720 are still within the range of dashes being analyzed. In one embodiment, process 500 generates synthetic dash centers in the dash profile at the expected positions of dashes 718 and 720 with reference to the identified positions of dashes 704A and 704B. Other embodiments of the process 500 adjust the predetermined number of dashes that are positioned between two dashes formed by a single printhead to account for the additional cross-process direction offset of the missing dashes 718 and 720 until process 500 uses dash 722A as a reference dash.

Figure 7D:
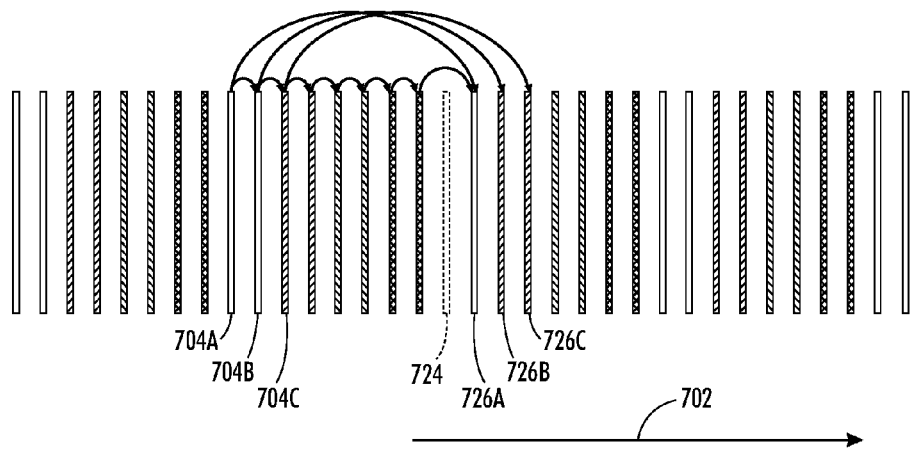
FIG. 7D is another front view of a row of dashes in a test pattern where one dash is missing from a section of the row.

In a third case the spacing between the reference dash and the next dash from the same printhead is not within the predetermined threshold (block 524), and the measured error is less than 1.5 dash periods (block 552) and greater than 0.5 dash periods for each of the M adjacent dashes (block 560). This situation occurs when the dash center corresponding to one dash is missing from the dash profile data. In FIG. 7D, the center corresponding to a single dash 724 (shown in broken lines) is missing from the dash profile data. The next three dashes, 726A, 726B, 726C each have an error of approximately one dash period in the cross-process direction compared to the expected cross-process distance from dashes 704A, 704B, and 704C, respectively.

When the identified error to each of the next M dashes is greater than 0.5 dash periods, process 500 identifies that one dash corresponding to the eighth dash from the reference dash 704A is missing and adjusts for the missing dash in additional iterations of the process 500 (block 564). Process 500 identifies the missing dash center and adjusts for additional iterations of the process with processing similar to the processing described in block 556. After identifying and adjusting for the missing dash, process 500 returns to block 532 using the next dash in the cross-process direction (dash 704B in FIG. 7D) as the next reference dash.

Figure 7E:
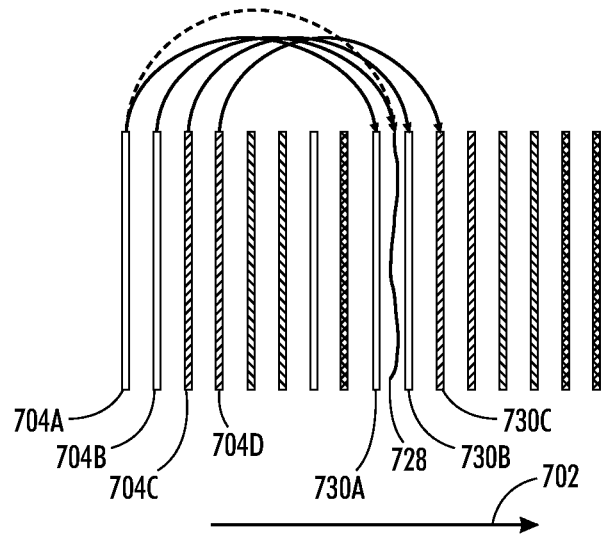
FIG. 7E is another front view of a row of dashes in a test pattern with a contaminant between two dashes in the row.

In another case, the dash profile data indicate that the eighth dash center identified for each of the M dashes in the dash profile is too close to each of the corresponding dashes (block 568). In one example, the cross-process direction distance between the reference dash and the remaining M dashes is greater than 0.5 dash periods closer than the expected distance. This case occurs when a contaminant on the image receiving member positioned between two dashes generates an apparent dash center in the dash profile data. As depicted in FIG. 7E, the dash profile data includes an apparent dash center corresponding to contaminant 728 on the image receiving member. Dashes 704A and 730A have been identified as being formed from the same printhead in a previous iteration of process 500. A reference dash 704B is associated with the contaminant 728, and two additional dashes 704C and 704D are associated with dashes 730B and 730C, respectively. The cross-process direction distances between dash 704B and contaminant 728, as well as between dash pairs 704C-730B and 704D-730C are each closer than 0.5 dash periods together compared to the expected distance between dashes formed by a single printhead.

When each of the identified cross-process direction distances are less than the predetermined threshold, process 500 returns to the previously identified pair of dashes and identifies the distance separating the previous reference dash and the next dash in the test pattern (block 572). In the example of FIG. 7E, process 500 identifies the cross-process direction distance between the previously identified reference dash 704A and the contaminant 728. In one embodiment, process 500 ignores the previously identified image data corresponding to the dash 730A and uses the image data corresponding to the contaminant 728 as the eighth dash. Process 500 compares the error in cross-process direction distances between the two previously identified dashes 704A and 730A with the error in cross-process direction between the previous reference dash 704A and the contaminant 728 (block 576). In FIG. 7E, the cross-process direction distance error between dashes 704A and 730A is less than the cross-process direction error between dash 704A and the contaminant 728. Process 500 subsequently ignores the image data corresponding to the contaminant 728 (block 580) and returns to block 532 to identify the Nth dash from reference dash 704B without the contaminant 728.

Figure 7F:
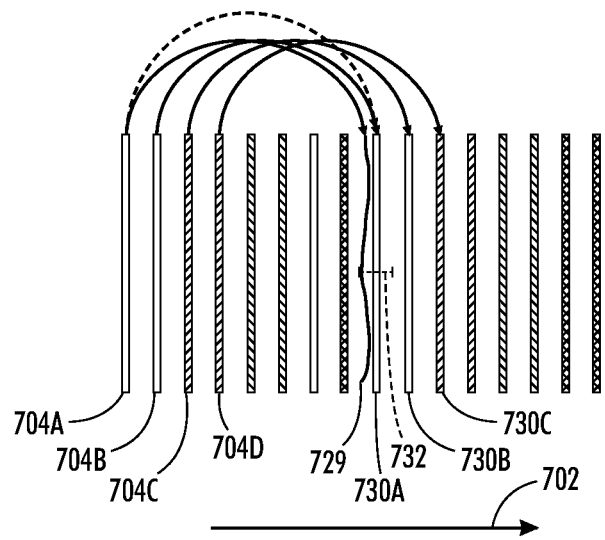
FIG. 7F is another front view of a row of dashes in a test pattern with a contaminant between two dashes in the row.

FIG. 7F depicts another contaminant 729 that is located near a valid dash 730A. In FIG. 7F, process 500 identifies that the contaminant 729 is the Nth dash from a first reference dash 704A. The contaminant 729 is located within 0.5 dash periods, depicted by error bars 732, of the expected location of the actual Nth dash 730A. Process 500 subsequently identifies that the cross-process distance between each of dash pairs 704B-730A, 704C-730B, and 704D-730C is less than the expected distance by a magnitude of more than 0.5 dash periods (block 568). Process 500 identifies the cross-process direction distance between the previous reference dash 704A and the next dash 730A (block 572). In the example of FIG. 7F, the cross-process direction error between the contaminant 729 and the previous reference dash 704A is larger than the cross-process direction error between dash 730A and the previous reference dash 704A (block 576). Process 500 discards the previously identified dash, which is the contaminant 729 in FIG. 7F, and associates the previous reference dash 704A with dash 730A (block 584). Process 500 continues to block 532 to identify the Nth dash from reference dash 704B without the contaminant 729.

Under certain conditions, the identified error between the previous reference dash 704A and the contaminant 729 may be less than the error between dashes 704A and 730A. For example, misalignments in the inkjets that generate either or both of dashes 704A and 730A may result in the cross-process direction distance between the contaminant 729 and the reference dash 704A being closer to the expected distance. Since process 500 removes the actual dash 730A from the image data corresponding to the row of dashes, the relative order of dashes in the test pattern remains accurate even though process 500 inaccurately identifies the contaminant 729 as a single dash. Since the cross-process direction position of each printhead is identified with reference to a large number of dashes, a small number of errors due to contaminants on the image receiving member does not substantially degrade the registration process 100.

In the context of process 100, process 500 is performed for each row of dashes in a test pattern such as test pattern 800. Process 500 enables improved accuracy of the detection of the cross-process direction positions of inkjets in each of the printheads in the print zone even when the printheads are misaligned in the cross-process direction. Process 500 can also tolerate a certain number of missing dashes in each row of dashes in the test pattern and identifies dash centers that are associated with contaminants rather than printed dashes under a limited range of conditions. However, because process 500 proceeds iteratively across a row, some identification errors within the row result in misidentification of all subsequent dashes in the row. In some cases, inoperable inkjets located at either end of a row of dashes result in the number of inkjets identified by process 500 being less than the predetermined number of dashes in the row of the test pattern.

Referring again to FIG. 1, process 100 continues by identifying errors in analysis and correcting for missing inkjets that are positioned at either end of the row of dashes in the cross-process direction (block 124). An error in analysis occurs when a missing jet is incorrectly inserted and/or a real dash is incorrectly identified as a contaminant and deleted. An incorrect dash insertion or identification results in misidentification of all dashes that occur after the analysis error in the row of dashes. If dash centers that are associated with the wrong printhead and inkjet are subsequently used for printhead alignment, the incorrectly identified position of each printhead could result in the printheads in the print zone being moved further out of registration instead of being moved into the correct registration.

In addition to analysis errors, one or more inkjets at either end of a row of dashes may be inoperable. While the process 500 identifies missing dashes within a row of dashes using the image data generated from the test pattern 800, a controller implementing process 500 is not configured to identify whether one or more dashes at either end of a row of dashes are missing from the test pattern. Referring to FIG. 8, an exemplary row of dashes 842 includes dashes 844 and 846 at one end of the row 842 in the cross-process direction, and dashes 848 and 850 at the other end of the row 842. If either or both of the outermost dashes 844 and 850 are missing, or if both of dashes 844 and 846 or dashes 848 and 850 are missing, then the controller implementing process 100 identifies the missing dashes at one or both ends of the row 842, and for any other rows in the test pattern.

Figure 6:
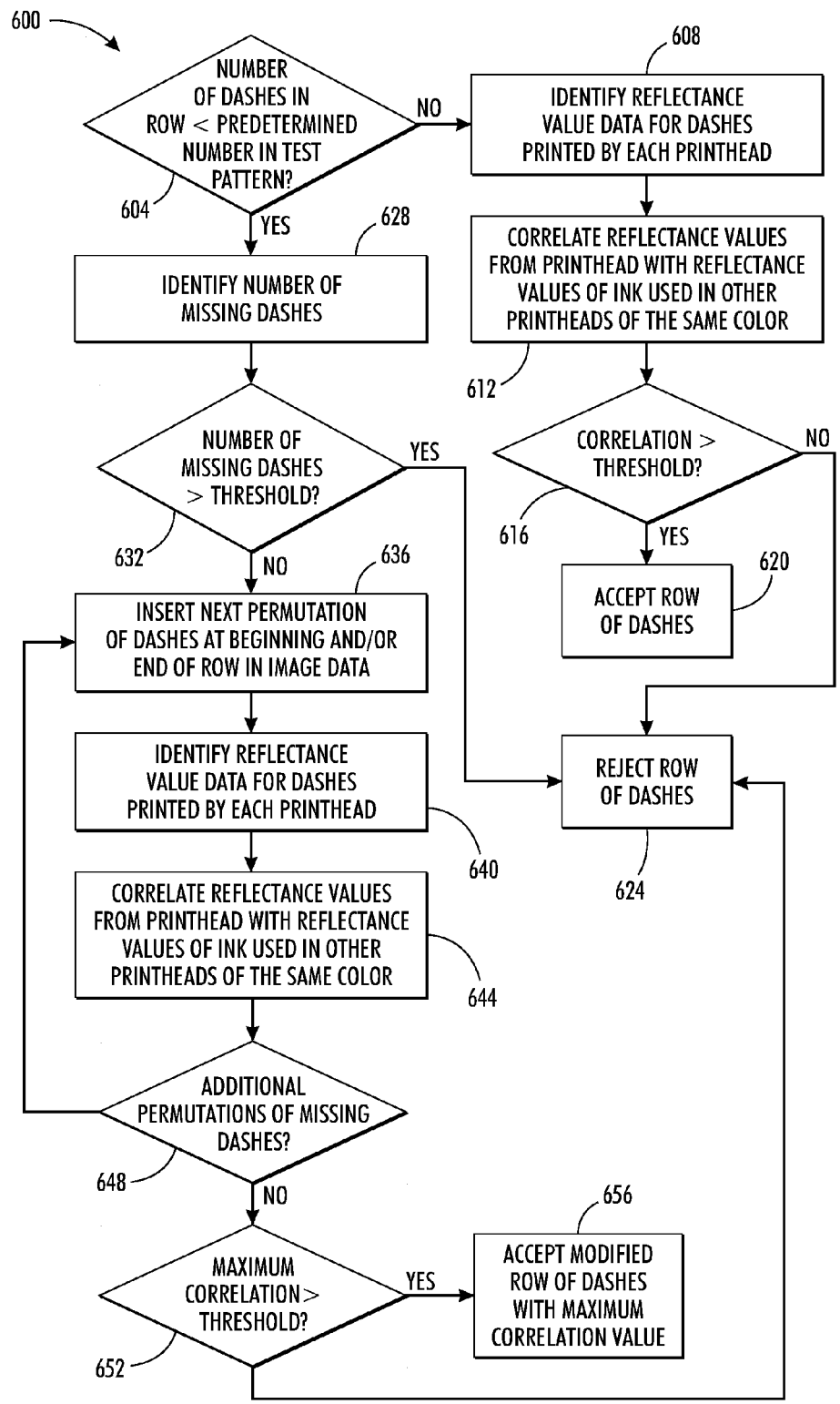
FIG. 6 is a block diagram of a process for identifying missing dashes at either end of a row of dashes in the cross-process direction.

FIG. 6 depicts the operation of block 124 in FIG. 1 in more detail. A process 600 both identifies if a row contains an analysis error, and identifies if dashes are missing from either or both ends of a row of dashes. Process 600 begins by determining if the number of dashes identified in image data corresponding to a single row of dashes is below the predetermined number of dashes included in the test pattern (block 604). In the printer 5, the controller 50 identifies the number of identified dashes present in the dash profile data corresponding to a single row of dashes in the test pattern. As described above with reference to process 500, some dashes may be missing from within the row of dashes. Any missing dashes that are identified by process 500 are not considered to be "missing" for the purposes of process 600 since the process 500 has already identified estimated cross-process locations for missing dashes within the row of dashes.

If the number of identified dashes in the row corresponds to the predetermined number of dashes in the row of the test pattern (block 604), process 600 identifies data regarding the reflectance values of dashes formed by each of the printheads that prints dashes in the test pattern row (block 608). The reflectance values correspond to numerical image data corresponding to image data generated by the optical sensor 54. In the printer 5, the controller 50 identifies the reflectance value for each dash in the center of the dash profile data as described in process 300 above. In other embodiments the reflectance value at the dash center may be a non-integer value, estimated from a quadratic interpolation of the minimum value and the points to either side of the minima. In one embodiment of process 600, the data identified for each printhead include the mean of reflectance values for the dashes formed by the printhead. Other embodiments of process 600 identify various data including the minimum, maximum, standard deviation and variance of reflectance values in the dash profile data corresponding to each printhead. Process 600 identifies the printhead that ostensibly printed each dash with reference to the predetermined arrangement of dashes in the test pattern, such as the predetermined arrangement of dashes depicted in the test pattern 800.

Process 600 correlates the reflectance data identified for each printhead with reflectance data corresponding to the color of ink printed from the other printheads in the print zone that print the same color of ink (block 612). As used herein, the term "correlation" refers to any mathematical relationship that describes a dependence between two sets of data. In process 600, the two sets of data include image data corresponding to dashes of one color of ink that are purportedly printed by a single printhead in a single row of dashes, and to image data of dashes printed by other printheads in the printer. In the example of printer 5, each printhead prints one of a cyan, magenta, yellow, or black ink. The reflectance values of the different colors of ink vary, with black ink having the lowest reflectance value, followed by magenta ink, cyan ink, and yellow ink. Alternative printer embodiments use different colors of ink that generate different reflectance values in the image data.

Process 600 identifies a nominal average reflectance value for each of the printheads that produce the image data of the test pattern 800. In other embodiments, an average could be calculated for all dashes, which are nominally of the same color, independent of which printhead printed each dash. In one embodiment, process 600 identifies a correlation coefficient r using the Pearson correlation. The correlation coefficient r is identified with the following equation:

$$r = \frac{1}{n-1} \sum_{i=1}^{n} \left( \frac{X_i - \overline{X}}{s_x} \right)\left( \frac{Y_i - \overline{Y}}{s_y} \right)$$

where each value of i corresponds to a single printhead within the system. $\overline{X}$ is a mean value of the reflectance of all printheads, $\overline{Y}$ is a mean value of a predetermined reflectance of ink having the same colors as printed by the printheads, $s_x$ is the standard deviation of average reflectance values for the printheads, and $s_y$ is a standard deviation of reflectance values expected for ink having the same color printed by the printheads in the print zone. The values $X_i$ correspond to the identified average reflectance values for each single printhead. The values $Y_i$ correspond to a normalized reflectance value expected for the printhead color. In some embodiments the correlation can be weighted, so that printheads which are only printing a few dashes contribute less to the correlation than printheads which are printing many dashes.

The value of r is referred to as a "correlation coefficient" and has a range of values from −1 to 1 using the Pearson correlation equation above. In process 600, if the correlation coefficient is greater than a predetermined threshold (block 616) then the row of dashes is accepted for use in identifying the cross-process direction position of a single printhead (block 620). In one embodiment, the predetermined threshold value for r is 0.95. If the identified value of the correlation coefficient r is below the predetermined threshold, then process 600 rejects the image data corresponding to the row of dashes (block 624) and the cross-process position of the printhead is identified with reference to other rows in the test pattern 800. The identified correlation value is less than the predetermined threshold in situations where a dash has been mistakenly inserted or removed from a row of dashes, leading subsequent dashes to be assigned to printheads having reflectance values for a different color of ink.

Process 600 also identifies image data corresponding to rows of dashes that include fewer than a predetermined number of dashes that are included in each row of the test pattern (block 604). In the context of process 600, if image data corresponding to a single row of dashes includes fewer than the predetermined number of dashes formed in the test pattern, then the missing dashes are at one or both ends of the row in the cross-process direction. If the number of missing dashes exceeds a predetermined threshold (block 632) then process 600 rejects the image data corresponding to the row of dashes (block 624). In one embodiment, process 600 rejects image data corresponding to rows of dashes that are missing a total of more than three dashes at either or both ends.

If the number of missing dashes is less than the predetermined threshold (block 632) process 600 inserts image data corresponding to permutations of reflectance values of the missing dashes to either or both ends of the row of dashes (block 636). Each row of dashes in the test pattern includes a predetermined series of dashes, and when process 600 inserts dashes, the printhead assigned to each subsequent dash shifts, which changes the expected reflectance value for the dash. For example, if a predetermined row of dashes begins with two black dashes, followed by two yellow dashes, then if process 600 inserts two dashes at the beginning of a row, the first dash identified by process 500 is expected to have a reflectance characteristic of yellow ink, rather than black ink.

After inserting image data corresponding to the missing dashes, process 600 identifies the reflectance value statistics for the dashes printed by each printhead (block 640) and generates a correlation value between the average and the expected printhead colors (block 644). Process 600 performs the processing described in blocks 640 and 644 in substantially the same manner as described above with reference to the processing described in blocks 608 and 612, respectively.

Process 600 continues to identify the correlation value for additional permutations of missing dashes (block 648). The number of permutations depends upon the number of identified missing dashes in a row of the test pattern. Process 600 generates a correlation coefficient value for each permutation of the image data. Each permutation represents one estimate of the missing dashes present at either end of the row of dashes. The permutation that generates the maximum correlation value compared to the other permutations represents a best estimate of the color and position of dashes that are missing from the row. If the maximum correlation value exceeds a predetermined threshold (block 652), then process 600 accepts the image data corresponding to the test row, including the inserted image data corresponding to the permutation that generated the maximum correlation value (block 656). If the maximum correlation value is below the predetermined threshold value, then process 600 rejects the row of dashes (block 624). In one embodiment, the comparisons described in blocks 616 and 652 uses a single correlation coefficient threshold, such as 0.95. In other embodiments, the correlation coefficient threshold referenced in block 652 is higher or lower than the threshold used by the processing described in block 616.

Process 600 is performed for image data corresponding to each row of dashes in the test pattern and for each printhead in the print zone. Process 600 eliminates rows that include analysis errors or that have too many dashes missing from either end of the row to improve the accuracy of identification of the cross-process direction position of each printhead in the print zone. Process 600 generates estimates of dashes that are missing from either end of a row to enable process 100 to correctly identify which printhead and jet have printed every dash identified.

Referring again to FIG. 1, process 100 continues the processing described in blocks 112-128 on the image data for each row of dashes printed on the media web (block 132). Process 100 then identifies the cross-process position of each printhead in the print zone with reference to the cross-process position of each dash in the test pattern and the identified inkjet and printhead that printed each dash (block 136).

In one embodiment, process 100 identifies the edges of each printhead in the cross-process direction with reference to the dashes formed by each printhead in the print zone. The alignment process repositions the printheads to place adjacent printheads in stitch alignment in the cross-process direction. For example, printheads 1024B and 1024C are moved into stitch alignment after identification of the cross-process location of the edges of each printhead.

Various filtering techniques can also remove some dashes that do not conform to the expected positions of inkjets in the each printhead. For example, one inkjet in a printhead may eject ink drops into an incorrect location on the media web when compared to neighboring inkjets in the same printhead. The dash formed by the malfunctioning inkjet can be filtered from the image data to increase accuracy of identifying the cross-process location of the printhead. Process 100 can also account for cross-process oscillation in the media web 100 so movement of the media web does not generate false results in the cross-process direction positions of each row of dashes in the test pattern.

After completion of process 100, the printer 5 can perform various registration processes known to the art to correct series or stitch misalignments that are detected with reference to the cross-process direction positions of each dash identified in process 100. Process 100 enables the printer 5 to identify the cross-process locations of each printhead in the print zone 1000 with the use of a single test pattern even when the printheads have comparatively large errors in cross-process or process registration that would require multiple test patterns and printhead registration operations using existing printhead registration methods.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for analyzing image data of a test pattern generated by a printer comprising:

identifying, with reference to a first threshold and a second threshold, a process direction position for each row of dashes in a plurality of rows of dashes in image data of a test pattern printed on an image receiving member, the test pattern being formed by each printhead in a plurality of printheads in a printer forming at least one dash in each row of dashes in the plurality of rows of dashes;

identifying a center of each dash in a cross-process direction;

identifying an inkjet that formed each dash in the plurality of rows of dashes; and identifying a cross-process direction position for one printhead in the plurality of printheads in the printer with reference to the identified cross-process direction centers of dashes formed by the identified inkjets in the one printhead;

the identification of the process direction position comprising:

convolving a plurality of sections of a single scanline of the image data generated by an optical detector in the cross-process direction with two periodic functions each having a period corresponding to spacing between dashes in one row of dashes;

summing a first square of the convolution for each of the two periodic functions in each of the plurality of sections of the single scanline;

convolving each scanline in a successive plurality of scanlines in the image data generated by the optical detector in the process direction from the single scanline in response to the sum of the first square of the convolution corresponding to the image data of the single scanline being greater than the first threshold;

summing a square of the convolution corresponding to the image data of each scanline in the successive plurality of scanlines until the sum of the square of the convolution of the image data corresponding to a final scanline in the successive plurality of scanlines is less than the first threshold; and identifying that image data corresponding to the successive plurality of scanlines between the single scanline and the final scanline correspond to a single row of dashes on the image receiving member in response to the sum of the square of the convolution for image data corresponding to at least one of the successive plurality of scanlines being greater than the second threshold, the second threshold being greater than the first threshold.

2. The method of claim 1, the identification of the center of each dash further comprising:
- generating a profile through a plurality of columns in the image data corresponding to a portion of the image receiving member surrounding one dash in the single row of dashes, the profile including a median value of image data in each column in the plurality of columns;
- identifying a median image data value for the one dash in the generated profile in a cross-process direction and an optical detector that generated the minimum image data value;
- generating a first curve through the identified median image data value for the one dash and two image data values, the two image data values corresponding to a response of a first optical detector positioned on one side of the optical detector that generated the median image data value and a second optical detector positioned on another side of the optical detector that generated the median image data value;
- generating a second curve through the identified median image data value for the dash and a second two image data values corresponding to a response of a third optical detector positioned on the one side of the first optical detector and a fourth optical detector positioned on the other side of the second optical detector;
- identifying a ratio of a curvature of the first curve to a curvature of the second curve; and
- identifying that a dash in the generated profile corresponds to a dash printed by an inkjet in response to the identified ratio being greater than a first predetermined ratio and less than a second predetermined ratio.

3. The method of claim 2 wherein the first curve and the second curve are quadratic curves.

4. A method for analyzing image data of a test pattern generated by a printer comprising:
- identifying, with reference to a first threshold and a second threshold, a process direction position for each row of dashes in a plurality of rows of dashes in image data of a test pattern printed on an image receiving member, the test pattern being formed by each printhead in a plurality of printheads in a printer forming at least one dash in each row of dashes in the plurality of rows of dashes;
- identifying a center of each dash in a cross-process direction;
- identifying an inkjet that formed each dash in the plurality of rows of dashes; and
- identifying a cross-process direction position for one printhead in the plurality of printheads in the printer with reference to the identified cross-process direction centers of dashes formed by the identified inkjets in the one printhead;
- identifying a series of dashes in a single row of dashes in the image data where a cross-process direction distance between two dashes formed by the one printhead within the series is within a predetermined threshold of a predetermined cross-process direction distance between two inkjets formed in the one printhead;
- identifying a cross-process direction distance between a first dash and a second dash in the image data corresponding to the single row of dashes by identifying a predetermined number of intermediate dashes between the first dash and the second dash, the first dash being one of the series of dashes and the second dash not being one of the series of dashes; and
- identifying that the one printhead formed the first dash and the second dash in response to the identified cross-process direction distance being within a predetermined threshold of an expected cross-process direction distance between the two dashes formed by the one printhead.

5. The method of claim 4 further comprising:
- identifying a second cross-process direction distance between a third dash that is adjacent to the first dash in the row of dashes and a fourth dash in the image data corresponding to the single row of dashes by identifying the predetermined number of intermediate dashes between the third dash and the fourth dash; and
- identifying the single row of dashes is missing two consecutive dashes in the cross-process direction in response to the identified cross-process direction distance and the second identified cross-process direction distance exceeding the expected cross-process direction distance between the two dashes formed by the one printhead by more than one and one half of a predetermined distance between adjacent dashes in the single row of dashes.

6. The method of claim 4 further comprising:
- identifying a second cross-process direction distance between a third dash that is adjacent to the first dash in the row of dashes and a fourth dash in the image data corresponding to the single row of dashes by identifying the predetermined number of intermediate dashes between the third dash and the fourth dash; and
- identifying the single row of dashes is missing a dash in the cross-process direction in response to the identified cross-process direction distance and the second identified cross-process direction distance exceeding the expected cross-process direction distance between the two dashes formed by the one printhead by more than one half of a predetermined distance between adjacent dashes in the single row of dashes.

7. The method of claim 6 further comprising:
- generating image data corresponding to the missing dash in an expected cross-process location of the missing dash, the generated image data including a value that indicates the generated dash corresponds to an inoperable inkjet in the one printhead.

8. The method of claim 4 further comprising:
- identifying a second cross-process direction distance between a third dash that is adjacent to the first dash in the row of dashes and a fourth dash in the image data corresponding to the single row of dashes by identifying the predetermined number of intermediate dashes between the third dash and the fourth dash; and
- identifying that a portion of the image data corresponding to the single row of dashes corresponds to a mark in the test pattern that is not a dash printed by an inkjet in the plurality of printheads in response to the identified cross-process direction distance and the second identified cross-process direction distance being less than the expected cross-process direction distance between the two dashes formed by the one printhead by more than one half of a predetermined distance between adjacent dashes in the single row of dashes.

9. The method of claim 4 further comprising:
- reversing an orientation of a portion of the image data in the cross-process direction corresponding to the identified series of dashes in the image data; and
- identifying a cross-process direction distance between one dash in the reversed portion of the image data and the second dash in the image data corresponding to the single row of dashes by identifying a predetermined number of intermediate dashes between the one dash and the second dash.

10. The method of claim 4 further comprising:
identifying the cross-process position for the one printhead with reference to identified cross-process positions of the first dash and the second dash.

11. A method for analyzing image data of a test pattern generated by a printer comprising:
identifying, with reference to a first threshold and a second threshold, a process direction position for each row of dashes in a plurality of rows of dashes in image data of a test pattern printed on an image receiving member, the test pattern being formed by each printhead in a plurality of printheads in a printer forming at least one dash in each row of dashes in the plurality of rows of dashes;
identifying a center of each dash in a cross-process direction;
identifying an inkjet that formed each dash in the plurality of rows of dashes; and
identifying a cross-process direction position for one printhead in the plurality of printheads in the printer with reference to the identified cross-process direction centers of dashes formed by the identified inkjets in the one printhead;
identifying an image data value for each dash in a first plurality of dashes in one row of the plurality of rows of dashes corresponding to a plurality of dashes formed by the one printhead with reference to a predetermined arrangement of dashes in the one row;
identifying an average image data value of the one printhead with reference to the image data values of the first plurality of dashes;
identifying an average image data value for at least one other printhead with reference to a plurality of image data values corresponding to a second plurality of dashes formed by the at least one other printhead, the one printhead and the at least one other printhead each ejecting a single color of ink;
identifying a correlation between the average image data value for the one printhead and the average image data value for the at least one other printhead; and
identifying the inkjet that formed each dash in the one row of dashes in response to the identified correlation exceeding a predetermined threshold.

12. The method of claim 11 further comprising:
identifying a number of dashes in the one row;
generating image data corresponding to a plurality of arrangements of dashes arranged at a first end and a second end of the one row in the cross-process direction in response to the identified number of dashes being less than a predetermined number;
identifying one of the plurality of arrangements of dashes in which the average image data value of the first plurality of dashes in the one arrangement has a maximum correlation value to the average image data value for the at least one other printhead; and
identifying the inkjet that formed each dash in the one row of dashes with reference to the one arrangement of dashes in response to the identified maximum correlation value exceeding the predetermined threshold.

13. The method of claim 11, the correlation identifying a Pearson correlation coefficient between the average image data value of the one printhead and the average image data value for the at least one other printhead.

14. An inkjet printer comprising:
a plurality of printheads arranged in a plurality of rows in a cross-process direction and columns in a process direction of a print zone, each printhead having a plurality of inkjets configured to eject ink drops onto an image receiving member moving past the plurality of printheads in the process direction;
a plurality of optical detectors configured in the cross-process direction across the image receiving member, each optical detector in the plurality of optical detectors being configured to detect light reflected from the image receiving member; and
a controller operatively connected to the plurality of printheads and the plurality of optical detectors, the controller being configured to:
generate a plurality of firing signals to eject ink from the plurality of inkjets in each printhead of the plurality of printheads to print a test pattern on the image receiving member, the test pattern including a plurality of rows of dashes, each row including a plurality of dashes printed by each printhead of the plurality of printheads;
generate image data corresponding to the plurality of rows of dashes on the image receiving member with the plurality of optical detectors;
identify, with reference to a first threshold and a second threshold, a process direction position for each row of dashes in the plurality of rows of dashes in the image data by:
convolving a plurality of sections of a single scanline of the image data in the cross-process direction with two periodic functions each having a period corresponding to spacing between dashes in one row of dashes;
summing a first square of the convolution for each of the two periodic functions in each of the plurality of sections of the single scanline;
convolving each scanline in a successive plurality of scanlines in the image data in the process direction from the single scanline in response to the sum of the first square of the convolution corresponding to the image data of the single scanline being greater than the first threshold;
summing a square of the convolution corresponding to the image data of each scanline in the successive plurality of scanlines until the sum of the square of the convolution of the image data corresponding to a final scanline in the successive plurality of scanlines is less than the first threshold; and
identifying that image data corresponding to the successive plurality of scanlines between the single scanline and the final scanline correspond to a single row of dashes on the image receiving member in response to the sum of the square of the convolution for image data corresponding to at least one of the successive plurality of scanlines being greater than a second threshold, the second threshold being greater than the first threshold; the controller also being configured to:
identify a center of each dash in a cross-process direction;
identify an inkjet that formed each dash in the row of dashes; and
identify a cross-process direction position for one printhead in the plurality of printheads with reference to the identified cross-process direction centers of dashes formed by the identified inkjets in the one printhead.

15. The inkjet printer of claim 14, the controller being further configured to:
generate a profile through a plurality of columns in the image data corresponding to a portion of the image receiving member surrounding one dash in the single row of dashes, the profile including a median value of image data in each column of the plurality of columns;

identify a median image data value for the one dash in the generated profile in a cross-process direction and an optical detector that generated the minimum image data value;

generate a first curve through the identified median image data value for the one dash and two image data values, the two image data values corresponding to a response of a first optical detector positioned on one side of the optical detector that generated the median image data value and a second optical detector positioned on another side of the optical detector that generated the median image data value;

generate a second curve through the identified median image data value for the dash and another two image data values that correspond to a response of a third optical detector positioned on the one side of the first optical detector and a fourth optical detector positioned on the other side of the second optical detector;

identify a ratio of a curvature of the first curve to a curvature of the second curve; and identify a dash in the generated profile that corresponds to a dash printed by an inkjet in response to the identified ratio being greater than a first predetermined ratio and less than a second predetermined ratio.

16. The inkjet printer of claim 15 wherein the first curve and the second curve are quadratic curves.

17. An inkjet printer comprising:
a plurality of printheads arranged in a plurality of rows in a cross-process direction and columns in a process direction of a print zone, each printhead having a plurality of inkjets configured to eject ink drops onto an image receiving member moving past the plurality of printheads in the process direction;
a plurality of optical detectors configured in the cross-process direction across the image receiving member, each optical detector in the plurality of optical detectors being configured to detect light reflected from the image receiving member; and
a controller operatively connected to the plurality of printheads and the plurality of optical detectors, the controller being configured to:
generate a plurality of firing signals to eject ink from the plurality of inkjets in each printhead of the plurality of printheads to print a test pattern on the image receiving member, the test pattern including a plurality of rows of dashes, each row including a plurality of dashes printed by each printhead of the plurality of printheads;
generate image data corresponding to the plurality of rows of dashes on the image receiving member with the plurality of optical detectors;
identify, with reference to a first threshold and a second threshold, a process direction position for each row of dashes in the plurality of rows of dashes in the image data;
identify a center of each dash in a cross-process direction;
identify an inkjet that formed each dash in the row of dashes; and
identify a cross-process direction position for one printhead in the plurality of printheads with reference to the identified cross-process direction centers of dashes formed by the identified inkjets in the one printhead;
identify a series of dashes in a single row of dashes in the image data where a cross-process direction distance between two dashes formed by the one printhead in the plurality of printheads within the series is within a predetermined threshold of a predetermined cross-process direction distance between two inkjets formed in the one printhead;
identify a cross-process direction distance between a first dash and a second dash in the image data corresponding to the single row of dashes by identifying a predetermined number of intermediate dashes between the first dash and the second dash, the first dash being one of the series of dashes and the second dash not being one of the series of dashes; and
identify that the one printhead formed the first dash and the second dash in response to the identified cross-process direction distance being within a predetermined threshold of an expected cross-process direction distance between the two dashes formed by the one printhead.

18. The inkjet printer of claim 17, the controller being further configured to:
identify a second cross-process direction distance between a third dash that is adjacent to the first dash in the single row of dashes and a fourth dash in the image data corresponding to the single row of dashes by identifying the predetermined number of intermediate dashes between the third dash and the fourth dash; and
identify that the single row of dashes is missing two consecutive dashes in the cross-process direction in response to the identified cross-process direction distance and the second identified cross-process direction distance exceeding the expected cross-process direction distance between the two dashes formed by the one printhead by more than one and one half of a predetermined distance between adjacent dashes in the single row of dashes.

19. The inkjet printer of claim 17, the controller being further configured to:
identify a second cross-process direction distance between a third dash that is adjacent to the first dash in the single row of dashes and a fourth dash in the image data corresponding to the single row of dashes by identifying the predetermined number of intermediate dashes between the third dash and the fourth dash; and
identify that the single row of dashes is missing a dash in the cross-process direction in response to the identified cross-process direction distance and the second identified cross-process direction distance exceeding the expected cross-process direction distance between the two dashes formed by the one printhead by more than one half of a predetermined distance between adjacent dashes in the single row of dashes.

20. The inkjet printer of claim 19, the controller being further configured to:
generate image data corresponding to the missing dash in an expected cross-process location of the missing dash, the generated image data including a value that indicates the generated dash corresponds to an inoperable inkjet in the one printhead.

21. The inkjet printer of claim 17, the controller being further configured to:
identify a second cross-process direction distance between a third dash that is adjacent to the first dash in the single row of dashes and a fourth dash in the image data corresponding to the single row of dashes by identifying the predetermined number of intermediate dashes between the third dash and the fourth dash; and identify that a portion of the image data corresponding to the single row of dashes corresponds to a mark in the test pattern that is not a dash printed by an inkjet in the plurality of printheads in response to the identified cross-process direction distance and the second identified cross-process direction distance being less than the expected cross-process direction distance between the two dashes formed by the one printhead by more than one half of a predetermined distance between adjacent dashes in the single row of dashes.

22. The inkjet printer of claim 17, the controller being further configured to:

reverse an orientation of a portion of the image data in the cross-process direction corresponding to the identified series of dashes in the image data; and identify a cross-process direction distance between one dash in the reversed portion of the image data and the second dash in the image data corresponding to the single row of dashes by identifying a predetermined number of intermediate dashes between the one dash and the second dash.

23. The inkjet printer of claim 17, the controller being further configured to:

identify the cross-process position for the one printhead with reference to identified cross-process positions of the first dash and the second dash.

24. An inkjet printer comprising:

a plurality of printheads arranged in a plurality of rows in a cross-process direction and columns in a process direction of a print zone, each printhead having a plurality of inkjets configured to eject ink drops onto an image receiving member moving past the plurality of printheads in the process direction;

a plurality of optical detectors configured in the cross-process direction across the image receiving member, each optical detector in the plurality of optical detectors being configured to detect light reflected from the image receiving member; and a controller operatively connected to the plurality of printheads and the plurality of optical detectors, the controller being configured to:

generate a plurality of firing signals to eject ink from the plurality of inkjets in each printhead of the plurality of printheads to print a test pattern on the image receiving member, the test pattern including a plurality of rows of dashes, each row including a plurality of dashes printed by each printhead of the plurality of printheads;

generate image data corresponding to the plurality of rows of dashes on the image receiving member with the plurality of optical detectors;

identify, with reference to a first threshold and a second threshold, a process direction position for each row of dashes in the plurality of rows of dashes in the image data;

identify a center of each dash in a cross-process direction;

identify an inkjet that formed each dash in the row of dashes; and identify a cross-process direction position for one printhead in the plurality of printheads with reference to the identified cross-process direction centers of dashes formed by the identified inkjets in the one printhead;

identify an image data value for each dash in a first plurality of dashes in one row of the plurality of rows of dashes corresponding to a plurality of dashes formed by the one printhead with reference to a predetermined arrangement of dashes in the one row;

identify an average image data value of the one printhead with reference to the image data values of the first plurality of dashes;

identify an average image data value for at least one other printhead with reference to a plurality of image data values corresponding to a second plurality of dashes formed by the at least one other printhead, the one printhead and the at least one other printhead each ejecting a single color of ink;

identify a correlation between the average image data value for the one printhead and the average image data value for the at least one other printhead; and identify the inkjet that formed each dash in the one row of dashes in response to the identified correlation exceeding a predetermined threshold.

25. The inkjet printer of claim 24, the controller being further configured to:

identify a number of dashes in the one row;

generate image data corresponding to a plurality of arrangements of dashes arranged at a first end and a second end of the one row in the cross-process direction in response to the identified number of dashes being less than a predetermined number;

identify one of the plurality of arrangements of dashes in which the average image data value of the first plurality of dashes in the one arrangement has a maximum correlation value to the average image data value for the at least one other printhead; and identify the inkjet that formed each dash in the one row of dashes with reference to the one arrangement of dashes in response to the identified maximum correlation value exceeding the predetermined threshold.

26. The inkjet printer of claim 24, the correlation identifying a Pearson correlation coefficient between the average image data value of the one printhead and the average image data value for the at least one other printhead.

* * * * *